(12) United States Patent
Kato

(10) Patent No.: US 7,213,316 B2
(45) Date of Patent: May 8, 2007

(54) MACHINE TOOL AND DETACHABLE/ATTACHABLE MOTOR

(75) Inventor: Heizaburo Kato, Shizuoka-ken (JP)

(73) Assignee: Sankyo Seisakusho Co., Tokyo (JP)

( * ) Notice: Subject to any disclaimer, the term of this patent is extended or adjusted under 35 U.S.C. 154(b) by 30 days.

(21) Appl. No.: 11/104,654

(22) Filed: Apr. 13, 2005

(65) Prior Publication Data

US 2005/0254914 A1 Nov. 17, 2005

(30) Foreign Application Priority Data

Apr. 28, 2004 (JP) ............................. 2004-132896
May 27, 2004 (JP) ............................. 2004-157447

(51) Int. Cl.
*B23Q 41/02* (2006.01)
*B23Q 1/66* (2006.01)
*B23Q 16/00* (2006.01)
*B23C 1/14* (2006.01)
*B23Q 3/157* (2006.01)

(52) U.S. Cl. ............... 29/33 P; 198/346.1; 74/814; 483/14; 409/167; 409/173; 269/56; 269/63

(58) Field of Classification Search ............. 29/33 P, 29/563, 27 C, 27 R; 198/346.1, 345.3; 74/813 R, 74/814; 483/14–15; 409/165, 167, 172–173, 409/159, 161; 269/63, 56; 82/165; 408/70–71
See application file for complete search history.

(56) References Cited

U.S. PATENT DOCUMENTS

| | | | | |
|---|---|---|---|---|
| 3,587,390 A | * | 6/1971 | Lohneis et al. | ............. 409/167 |
| 4,599,769 A | * | 7/1986 | Latzko et al. | ............... 29/26 A |
| 4,747,193 A | * | 5/1988 | Hashidate et al. | ........... 29/33 P |
| 4,987,834 A | * | 1/1991 | Peck et al. | ................... 104/300 |
| 5,161,662 A | * | 11/1992 | Kuse | ........................... 29/33 P |
| 5,172,464 A | * | 12/1992 | Kitamura et al. | ............. 29/563 |
| 5,213,192 A | * | 5/1993 | Kuse | ........................ 198/346.1 |
| 5,412,863 A | * | 5/1995 | Prodel | ......................... 29/33 P |
| 5,933,933 A | * | 8/1999 | Fritz et al. | ................... 29/33 P |
| 6,493,923 B1 | | 12/2002 | Mabuchi | |
| 6,986,194 B2 | * | 1/2006 | Lanvin | ......................... 29/563 |
| 2003/0123944 A1 | * | 7/2003 | Lanvin | ........................ 409/172 |

FOREIGN PATENT DOCUMENTS

| | | |
|---|---|---|
| DE | 7538902 U | 4/1976 |
| EP | 0398030 A2 | 11/1990 |
| EP | 0552982 A1 | 7/1993 |
| EP | 1050363 A2 | 11/2000 |
| JP | 08-163844 | 6/1996 |
| JP | 2003-311565 | 11/2003 |

OTHER PUBLICATIONS

Partial European Search Report dated Sep. 8, 2005, directed to counterpart foreign application.

* cited by examiner

*Primary Examiner*—Erica Cadugan
(74) *Attorney, Agent, or Firm*—Morrison & Foerster LLP

(57) ABSTRACT

A machine tool is provided with: a rotating table apparatus that has a table for holding a workpiece, and that rotates the table based on a drive force that has been input; a processing area for processing the workpiece, the rotating table apparatus being carried into and out from the processing area; and a drive source for inputting the drive force when connected to the rotating table apparatus, the drive source being provided in the processing area such that the drive source can be disconnected from the rotating table apparatus.

17 Claims, 32 Drawing Sheets

MACHINE TOOL AND DETACHABLE/ATTACHABLE MOTOR

CROSS-REFERENCE TO RELATED APPLICATIONS

The present application claims priority upon Japanese Patent Application No. 2004-132896 filed on Apr. 28, 2004 and Japanese Patent Application No. 2004-157447 filed on May 27, 2004, which are herein incorporated by reference.

BACKGROUND OF THE INVENTION

1. Field of the Invention

The present invention relates to machine tools and detachable/attachable motors.

2. Description of the Related Art (1) Some machine tools that use a machining center etc. to machine workpieces in a processing area have, in the processing area, a rotating table apparatus that rotatably holds a workpiece (see JP 2003-311565A (pages 4 and 5)). Such machine tools process workpieces as follows.

First, an unprocessed workpiece is carried into the processing area and this workpiece is held by the rotating table apparatus. The workpiece is then continuously or intermittently rotated in a suitable way as it is processed by a tool of the machining center. After processing, the processed workpiece is removed from the rotating table apparatus and carried out of the processing area.

When there is trouble with the rotating table apparatus, however, processing cannot be performed until the rotating table apparatus is repaired, and this may lower the operating rate of the machine tool.

A structure that is provided with a plurality of rotating table apparatuses 321 that can be carried into and out from a processing area A1 as shown in FIG. 19 is a conceivable reference example of a machine tool that is capable of solving the above-mentioned problem. If each rotating table apparatus 321 holds a workpiece W and is on standby in a work area other than the processing area A1, then, in the event that there is trouble with the rotating table apparatus 321 undergoing processing in the processing area A1, one of rotating table apparatuses 321 on standby can be carried into the processing area A1 so that processing can be resumed quickly, thus keeping the operating rate of the machine tool 301 from dropping.

However, the drive source of the rotating table apparatuses 321 generally is a motor 361 to which power is supplied through an associated power cable 362. For this reason, there is a possibility that, in the course of moving the plurality of rotating table apparatuses 321 into and out of the processing area A1, their power cables 362 may become tangled.

(2) Incidentally, an electric motor 2461 (hereinafter, referred to as "motor") is used as a drive device that is connected to a driven rotation shaft and applies a rotational force thereto. The motor 2461 is a device that converts electrical power into motive power.

FIG. 32 is a central cross-sectional view for describing an example of the structure of the motor 2461.

As shown in the figure, the motor 2461 is provided with a cylindrical stator 2464 and a rotor 2463 that is accommodated in the space within the stator 2464 and that is rotatably supported at its two ends by a pair of bearings 2468 provided in the stator 2464. A permanent magnet 2467 is provided on the outer circumferential surface of the rotor 2463, whereas a plurality of coils 2466 are arranged on the inner circumferential surface of the stator 2464 at an interval of a predetermined angle in the circumferential direction. By sending an alternating current through the coils 2466 while maintaining the phase difference that corresponds to this predetermined angle, the permanent magnet 2467 is magnetically drawn toward the coils 2466 in the circumferential direction in sequence, causing rotation of the rotor 2463 (for example, see JP 8-163844A (pages 2 to 4 and FIG. 1).

In a case where the driven rotation shaft 2441, which is axially supported by a predetermined support member 2427, is rotated using a motor such as the motor 2461, the rotor 2463 of the motor 2461 is connected to the driven rotation shaft 2441 through an intermediate element 2451 such as a coupling. Once connected, the motor is used under the assumption that it will not be disconnected except for repair or maintenance.

In some cases, however, it may be preferable to adopt a structure in which the motor 2461 can be attached and detached (that is, "connected" and "disconnected" as referred to above) to and from the driven rotation shaft 2441. One such case is where a single motor 2461 is used in common for a plurality of driven rotation shafts 2441. If such attachment/detachment is possible, then it is conceivable that the structure of the motor 2461 can be made simpler and more compact compared to that described above. Currently, however, no such motors 2461 are available on the market.

SUMMARY OF THE INVENTION

The present invention has been arrived at in light of these conventional issues. It is an object of the present invention to achieve a machine tool with which the operating rate of the machine tool is kept from dropping even if there is trouble with the rotating table apparatus holding a workpiece, and with which tangling of the motive force transmission path member, such as the power cable, for supplying motive force to the drive source of the rotating table apparatus is prevented from ever occurring. Another object of the present invention is to achieve a detachable/attachable motor with which rotational force is applied to a driven rotation shaft by detachably connecting a rotor to the driven rotation shaft, that can be made compact, and that is simple and inexpensive with few structural elements.

One aspect of the present invention is a machine tool comprising: a rotating table apparatus that has a table for holding a workpiece, and that rotates the table based on a drive force that has been input; a processing area for processing the workpiece, the rotating table apparatus being carried into and out from the processing area; and a drive source for inputting the drive force when connected to the rotating table apparatus, the drive source being provided in the processing area such that the drive source can be disconnected from the rotating table apparatus.

Another aspect of the present invention is a detachable/attachable motor comprising: a rotor that is configured to be connectable to a driven rotation shaft in a coaxial and detachable manner, the driven rotation shaft being supported on a support member through a bearing such that the driven rotation shaft is rotatable about an axis thereof, the driven rotation shaft having a projection formed on an end section thereof, the rotor applying a rotational force to the driven rotation shaft when connected to the driven rotation shaft; and a depression directly formed in an end section of the rotor in an axial direction thereof, the depression engaging with the projection formed on the end section of the driven rotation shaft and being provided for transmitting the rotational force to the driven rotation shaft.

Another aspect of the present invention is a detachable/attachable motor comprising: a rotor that is configured to be connectable to a driven rotation shaft in a coaxial and detachable manner, the driven rotation shaft being supported on a support member through a bearing such that the driven rotation shaft is rotatable about an axis thereof, the rotor applying a rotational force to the driven rotation shaft when connected to the driven rotation shaft, wherein, in the disconnected state, the rotor is supported at one end by the single bearing provided in a stator of the motor, and wherein, in the connected state, the rotor is supported at two points by being supported by the single bearing and also a bearing of the support member through the driven rotation shaft.

Features and objects of the present invention other than the above will become clear by reading the description of the present specification with reference to the accompanying drawings.

BRIEF DESCRIPTION OF THE DRAWINGS

In order to facilitate further understanding of the present invention and the advantages thereof, reference is now made to the following description taken in conjunction with the accompanying drawings.

DETAILED DESCRIPTION OF THE INVENTION

Figure 1:
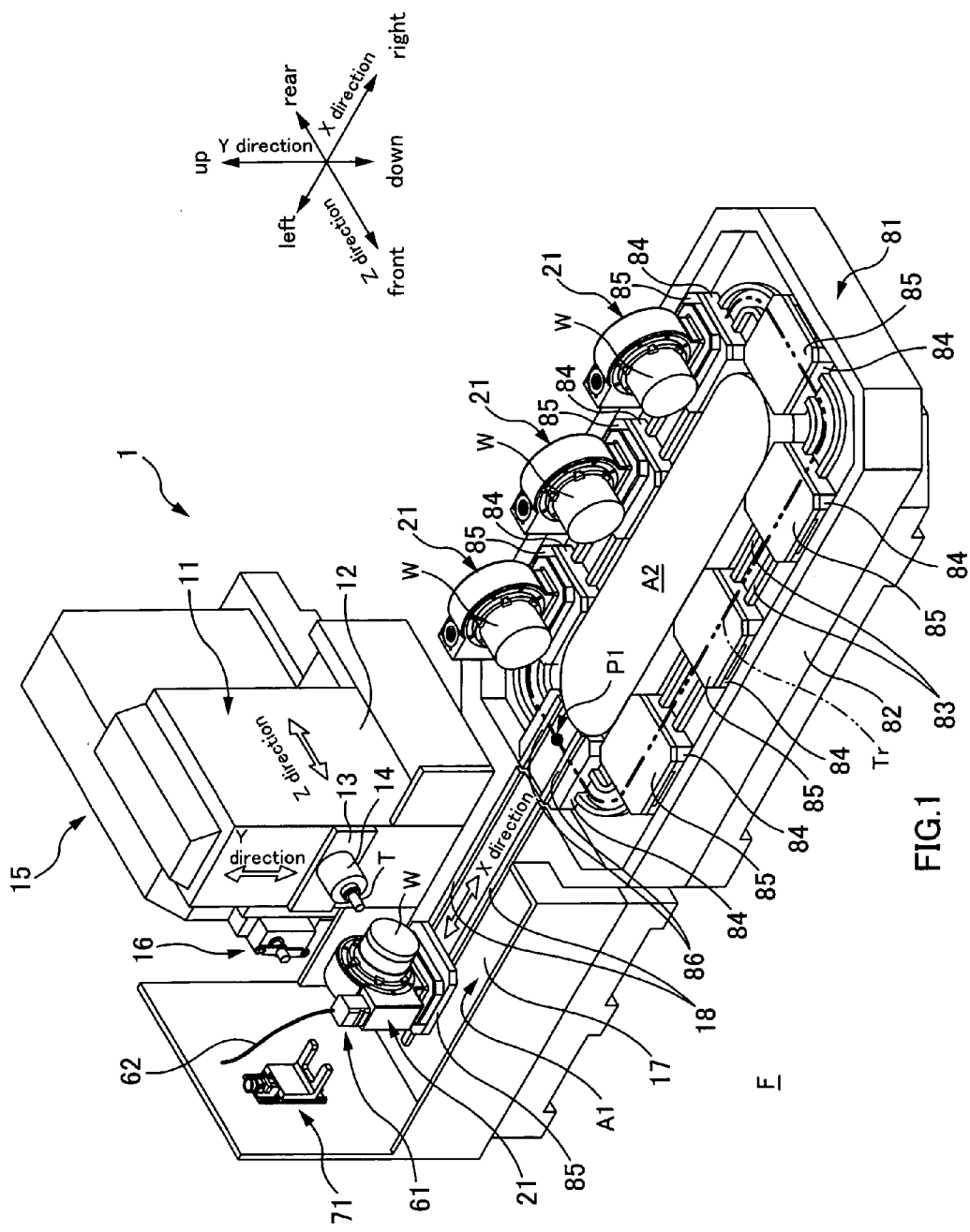
FIG. 1 is a perspective view of a machine tool 1 according to a first embodiment.

At least the following matters will be made clear by the explanation in the present specification and the description of the accompanying drawings.

(1) A main aspect of the present invention is a machine tool comprising: a rotating table apparatus that has a table for holding a workpiece, and that rotates the table based on a drive force that has been input; a processing area for processing the workpiece, the rotating table apparatus being carried into and out from the processing area; and a drive source for inputting the drive force when connected to the rotating table apparatus, the drive source being provided in the processing area such that the drive source can be disconnected from the rotating table apparatus.

According to the above-mentioned machine tool, the drive source disposed in the processing area can be disconnected from the rotating table apparatus. Thus, in the event that there is trouble with the rotating table apparatus in the processing area during processing, the processing task can be resumed immediately without long interruption. In other words, the broken rotating table apparatus is disconnected from the drive source and carried out from the processing area, and in its place a normal rotating table apparatus holding a workpiece is carried into the processing area and connected to the drive source, thus allowing the processing task to be resumed immediately.

Consequently, the processing task can be performed substantially continuously without any waiting for the broken rotating table apparatus to be repaired, and this allows the operating rate of the machine tool and its productivity to be kept high.

It is also possible for the drive source to be disconnected from the rotating table apparatus when it is carried into and away from the processing area. Consequently, tangling of the motive-force supply-path member, such as the power cable, for supplying motive force such as electrical power to the drive source can be effectively prevented.

Further, a single drive source can be used in common for a plurality of rotating table apparatuses, and thus the overall manufacturing and maintenance costs of the machine tool can be lowered.

In the foregoing machine tool, it is preferable that the drive source is disconnected from the rotating table apparatus when the rotating table apparatus is carried out from the processing area; and the drive source is connected to the rotating table apparatus when the rotating table apparatus is carried into the processing area.

In this way, the foregoing actions can be reliably attained.

In the foregoing machine tool, it is also preferable that carrying of the rotating table apparatus into and out from the processing area is performed in a state where the workpiece is held on the table.

In this way, a location that is more suitable than the processing area can be appropriately chosen for a work area for making the rotating table apparatuses hold a workpiece. That is, there is an excellent degree of freedom with respect to selection of the holding-task area.

In the foregoing machine tool, it is also preferable that the drive source has a drive shaft that is driven to rotate by being supported on a casing of the drive source such that the drive shaft is rotatable about an axis thereof; the rotating table apparatus has a housing that supports the table such that the table is rotatable about an axis thereof, an input shaft that is supported on the housing such that the input shaft is rotatable about an axis thereof, a cam that is formed in the input shaft, and a cam follower that is provided on an outer circumferential surface of the table and that engages the cam; through a first connecting structure, the drive shaft and the input shaft are detachably connected while being restricted from relative rotation about their axes; and through a second connecting structure, the casing when in the connected state is non-rotatably connected to the housing.

In this way, the casing of the drive source and the housing of the rotating table apparatus are non-rotatably connected by the second connecting structure. Thus, even if the rotation counterforce of the drive shaft of the drive source acts on the casing, the casing can effectively oppose that rotation counterforce without moving. Consequently, the drive shaft can reliably and stably transmit an expected drive force to the input shaft.

Further, the rotating table apparatus uses a cam and cam followers to rotate the table. Thus, there is an excellent degree of quietness when the table is rotated at high speeds.

In the foregoing machine tool, it is also preferable that the cam is a globoidal cam.

With the foregoing machine tool, a globoidal cam is used as the cam. Thus, both lateral surfaces of the rib of the globoidal cam are always sandwiched by at least two cam followers, and this leads to a structure where there is no backlash whatsoever between the cam followers and the rib. Further, a cam curve is expressed by the rib of the globoidal cam. Therefore, a planned rotation as expressed by the cam curve can be given to the table through the cam followers.

This sandwiching-type structure allows the table to be rotated with high precision even if the rotation load of the table is large. Therefore, the rotation table apparatus can be used as the rotation spindle of a lathe, which is subjected to large rotation loads.

In the foregoing machine tool, it is also preferable that the first connecting structure has, in either one of the drive shaft and the input shaft, a fitting depression that is formed with its rotation center in alignment with the axis of that shaft, and in the other shaft, a fitting projection that is formed with its rotation center in alignment with the axis of the other shaft and that fits into the fitting depression; and the second connecting structure has an engagement depression that is formed in either one of the casing and the housing, and an engagement projection that is formed in the other one of the casing and the housing and that engages with the engagement depression.

In this way, the drive shaft and the input shaft are connected by a fitting projection being fitted into a fitting depression. Thus, simply by moving the drive shaft and the rotating table apparatus relative to one another in the axial direction, which is the fitting direction, these can be connected and disconnected, and this gives excellent stability to the connecting and disconnecting operation.

In the foregoing machine tool, it is also preferable that either one of the fitting depression and the fitting projection is formed in a shaft coupling that is held, while being restricted from relative rotation, on either one of the drive shaft and the input shaft; and the shaft coupling is movably guided in the fitting direction in accordance with an external force that acts in the fitting direction.

In this way, even when there is a deviation in the rotation angle etc. between the fitting depression and the fitting projection when connecting the drive shaft to the input shaft and the two cannot be fitted together well, the shaft coupling can be rotated while allowing the fitting projection to be pushed into the fitting depression due to the movement of the shaft coupling in the fitting direction. Therefore, it is possible to align the rotation angles etc. of the two, and thus the fitting projection can be quickly fitted into the fitting depression.

In the foregoing machine tool, it is also preferable that either one of the first connecting structure and the second connecting structure is provided with a detach-stop structure that, when detaching the fitting projection from the fitting depression, prevents the fitting projection from detaching unless a force of a predetermined intensity is applied in the direction opposite from the fitting direction.

In this way, the drive source cannot be disconnected from the rotating table apparatus unless a force that is at least as large as a predetermined force is applied. Therefore, the state of the connection between the rotating table apparatus and the drive source becomes stable.

In the foregoing machine tool, it is also preferable that the detach-stop structure has an engagement groove formed in a portion on either one of the drive source side and the rotating table apparatus side, an engagement member that is provided in a portion on the other side and that, when in the connected state, faces the engagement groove, and a pushing member that pushes the engagement member toward the engagement groove.

In this way, the detach-stop structure can be constituted by a simple structure that includes an engagement groove, an engagement member, and a pushing member.

In the foregoing machine tool, it is also preferable that a drive-source attach-detach device having a grasping section that is movably guided in the fitting direction and the direction opposite therefrom is disposed in the processing area; and the drive source and the rotating table apparatus are connected and disconnected by moving the grasping section that has grasped the drive source in the fitting direction and the direction opposite therefrom.

In this way, the drive source and the rotating table apparatus can be connected and disconnected by the simple operation of moving the grasping section in the fitting direction and in the direction opposite therefrom. Thus, there is excellent stability in the connecting and disconnecting operations.

In the foregoing machine tool, it is also preferable that a tool held by the machine tool is disposed in the processing area; and the rotating table apparatus that has been carried into the processing area is guided to be movable relative to the tool.

In this way, the workpiece can be processed while it is moved relative to the tool of the machine tool, thereby providing an excellent degree of freedom in the processing.

In the foregoing machine tool, it is also preferable that a plurality of rotating table apparatuses are on standby outside the processing area, each of the rotating table apparatuses holding a workpiece.

In this way, a rotating table holding a workpiece can be carried into the processing area as soon as the processing area is vacated, and this allows the operating rate of the processing area to be kept high.

In the foregoing machine tool, it is also preferable that the machine tool has a carry track over which the rotating table apparatus is movably guided; and a branch point that leads to the processing area is set on the carry track, and through the branch point, carrying to and from the processing area is achieved.

In this way, the rotating table apparatuses can be easily carried into and out of the processing area through the branch point on the carry track leading to the processing area.

In the foregoing machine tool, it is also preferable that the carry track has a circulation track; and the circulation track is a work area in which a task of causing the rotating table apparatus to hold the workpiece is performed.

In this way, the circulation track can be used as a work area.

In the foregoing machine tool, it is also preferable that the rotating table apparatus in the circulation track is moved with the workpiece facing to the inside of the circulation track; at the branch point, the rotating table apparatus is carried into the processing area with the workpiece facing the inside of the circulation track, the processing area being positioned outside the circulation track; and the drive source and a drive-source attach-detach device are disposed at a position in the processing area on a side that is opposite from the workpiece.

In this way, the workpieces on the circulation track are always facing toward the inside of the circulation track. Therefore, the open space inside the circulation track can be effectively utilized as a work area for making the rotating table apparatuses hold workpieces.

Further, the rotating table apparatuses are carried into the processing area, which is positioned outside the circulation track, at the branch point with their workpiece facing inward, and the drive source and the drive-source attach-detach device are disposed at a position on the side opposite from the workpieces in the processing area. Thus, the rotating table apparatus, the drive source, and the drive-source attach-detach device are all positioned more toward the end of the processing area than the workpiece, and therefore they do not interfere whatsoever with the task of processing.

In the foregoing machine tool, it is also preferable that the drive source is a servo motor.

In this way, the rotation angle of the table can be controlled with high precision. Consequently, when the workpiece has a plurality of processing surfaces in the rotation direction of the rotating table, then by indexing and rotating the table with high precision, each processing surface can be processed, thereby providing an excellent degree of freedom in processing.

In the foregoing machine tool, it is also preferable that the drive source generates the drive force by being supplied with a motive force such as electrical power; and a motive-force supply-path member such as a power cable for supplying the motive force is connected to the drive source.

In this way, a commonplace motive-force supply-path member such as a power cable can be used as the means for supplying motive force to the drive source, without adopting a special measure such as wireless connection. Therefore, the machine tool is superior in versatility.

(2) Another main aspect of the present invention is a detachable/attachable motor comprising: a rotor that is configured to be connectable to a driven rotation shaft in a coaxial and detachable manner, the driven rotation shaft being supported on a support member through a bearing such that the driven rotation shaft is rotatable about an axis thereof, the driven rotation shaft having a projection formed on an end section thereof, the rotor applying a rotational force to the driven rotation shaft when connected to the driven rotation shaft; and a depression directly formed in an end section of the rotor in an axial direction thereof, the depression engaging with the projection formed on the end section of the driven rotation shaft and being provided for transmitting the rotational force to the driven rotation shaft.

With this detachable/attachable motor, a depression rather than a projection is formed in an end section of the rotor. Therefore, the overall length of the detachable/attachable motor in the axial direction can be shortened, and as a result the detachable/attachable motor as a whole can be made more compact.

Further, the depression is formed directly in the end section of the rotor, and thus it is not necessary to provide an intermediate element such as a shaft coupling for connecting to the projection of the driven rotation shaft. Thus, not only can the structure of the motor be simplified, but its manufacturing costs can be reduced as well. Moreover, the impact of torsion, for example, caused by an intermediate element can be eliminated, and this gives the detachable/attachable motor an excellent degree of precision with regard to transmitting rotational force to the driven rotation shaft.

In the foregoing detachable/attachable motor, it is preferable that engagement between the projection and the depression is a spline fitting that permits relative movement in the axial direction between the projection and the depression while restricting relative rotation about the axis.

With this detachable/attachable motor, simply by moving the projection and the depression relatively in the axial direction, they can be engaged or disengaged. Thus, the rotor and the driven rotation shaft can be connected and disconnected easily and reliably.

Also, when engaged, the spline fitting reliably restricts relative rotation of the two about their axes, and thus the rotational force of the rotor can be reliably transmitted to the driven rotation shaft.

In the foregoing detachable/attachable motor, it is preferable that a first magnetic member is provided on an outer circumferential portion of the end section in which the depression is formed, and a second magnetic member that is for generating the rotational force in cooperation with the first magnetic member is provided on a portion of a stator that is in opposition to the first magnetic member.

With this detachable/attachable motor, the depression is formed in an inner portion of the end section surrounded by the first magnetic member. Thus, the inner portion surrounded by the first magnetic member can be effectively used as a connecting member, and this allows the detachable/attachable motor to be made compact as regards its dimension in the axial direction.

In the foregoing detachable/attachable motor, it is preferable that the stator has a hole in the axial direction that is for accommodating the rotor; the second magnetic member is disposed on an inner circumferential surface of the hole; and both end sections of the rotor are arranged at positions close to end sections of the hole where they do not project from the hole.

With this detachable/attachable motor, the end sections of the rotor are arranged at positions near the end sections of the hole where they do not project from the hole. Therefore, a sufficiently wide range over which the first magnetic member and the second magnetic member oppose one another can be secured in the axial direction, and thus it is possible to achieve a motor that outputs a large rotational force for its compact size.

A yet further main aspect of the present invention is a detachable/attachable motor comprising: a rotor that is configured to be connectable to a driven rotation shaft in a coaxial and detachable manner, the driven rotation shaft being supported on a support member through a bearing such that the driven rotation shaft is rotatable about an axis thereof, the rotor applying a rotational force to the driven rotation shaft when connected to the driven rotation shaft, wherein, in the disconnected state, the rotor is supported at one end by the single bearing provided in a stator of the motor, and wherein, in the connected state, the rotor is supported at two points by being supported by the single bearing and also a bearing of the support member through the driven rotation shaft.

With this detachable/attachable motor, the rotor, when in the connected state, is also supported by the bearing of the support member through the driven rotation shaft. Consequently, the number of bearings that the motor itself is provided with can be reduced by one, but the rotor can still be supported at two points when in the connected state, and this allows the rotor to rotatively drive in a stable manner.

In other words, the number of bearings that the detachable/attachable motor is itself provided with can be reduced by one without impairing the stability of the rotor during rotation, and this allows the motor to be provided with a simple structure as well as reduces manufacturing costs.

In the foregoing detachable/attachable motor, it is preferable that, of the two end sections of the rotor, the single bearing supports an end section on the side opposite from an end section that is configured to be connectable to the driven rotation shaft.

With this detachable/attachable motor, the rotor is positioned between the two bearings that achieve the two-point supported state and is completely supported at both ends, and thus rotation of the rotor can be stabilized even further.

In the foregoing detachable/attachable motor, it is preferable that the single bearing is a ball bearing.

With this detachable/attachable motor, the single bearing is an expensive ball bearing, and thus the manufacturing costs of the detachable/attachable motor can be kept even lower.

Further, since the bearing is a ball bearing, the end section of the rotor, when supported at one end in the disconnected state, can swing about the ball bearing. Thus, even if, at the time of engaging the projection and the depression, the two are off-position, the end section can slide so that the depression follows the projection, and thus the possibility that the projection and the depression fail to engage can be kept low.

In the foregoing detachable/attachable motor, it is preferable that the stator has a hole in the axial direction that is for accommodating the rotor; a second magnetic member that is for generating the rotational force in cooperation with a first magnetic member that is provided on an outer circumferential surface of the rotor is disposed on an inner circumferential surface of the hole; and the end sections of the rotor are arranged at positions close to end sections of the hole where they do not project from the hole.

With this detachable/attachable motor, the end sections of the rotor are arranged at positions near the end sections of the hole where they do not project from the hole. Therefore, a sufficiently wide range over which the first magnetic member and the second magnetic member oppose one another can be secured in the axial direction, and thus it is possible to achieve a motor that generates a large torque for its compact size.

In the foregoing detachable/attachable motor, it is preferable that a sensor for detecting rotation of the rotor is provided between the single bearing and the second magnetic member in the axial direction.

With this detachable/attachable motor, the sensor is provided between the bearing of the rotor and the second magnetic member, and is located close to the bearing. Consequently, rotation of the rotor can be detected stably.

In the foregoing detachable/attachable motor, it is preferable that one of the first magnetic member and the second magnetic member is a permanent magnet or a coil through which a current flows, and the other is a coil through which a current flows.

With this detachable/attachable motor, when a current is sent to the coil, which functions as the other magnetic member, then a rotational force due to the electromagnetic force is generated in the one magnetic member, and as a result the rotor is rotated. Therefore, the driven rotation shaft can be rotated by supplying a current.

In the foregoing detachable/attachable motor, it is preferable that an engagement projection and an engagement depression are formed in the stator and the support member, the engagement projection and the engagement depression being configured to engage one another when the rotor and the driven rotation shaft are connected and to restrict relative rotation between the stator and the support member.

With this detachable/attachable motor, when in the connected state, the stator of the motor is non-rotatably connected to the support member through the engaging between the engagement projection and the engagement depression. Thus, even if a rotation counterforce that results from rotation of the rotor acts on the stator, the stator can effectively oppose the rotation counterforce without being moved. The rotor therefore can reliably and stably transmit an expected rotational force to the driven rotation shaft.

In the foregoing detachable/attachable motor, it is preferable that the rotor and the driven rotation shaft are connected and disconnected by a pinching arm pinching the motor, the pinching arm being configured to move back and forth between a standby position and a connecting position set in the axial direction; and groove sections for pinching with the pinching arm are provided in a pair of outside surfaces of the stator in a direction that intersects the axial direction.

With this detachable/attachable motor, groove sections are carved in a direction that intersects the axial direction. The pinching arm therefore can effectively engage the grooves when it has pinched the motor and moves back and forth in the axial direction, and thus an external force for connecting and disconnecting can be reliably applied to the detachable/attachable motor. As a result, the reliability of the connecting and disconnecting operations can be increased.

<<<Regarding the Machine Tool>>>

===First Embodiment of a Machine Tool===

<Overview of the Machine Tool>

FIG. 1 is a perspective view of a machine tool 1 according to a first embodiment. It should be noted that for the sake of description, as shown on the upper right of FIG. 1, of the three directions perpendicular to one another, the X direction is the left-right horizontal direction, the Y direction is the up-down vertical direction, and the Z direction is the front-rear horizontal direction.

The machine tool 1 is provided with a processing area A1 for processing a workpiece W using a tool T, and a rotating table carry mechanism 81 that carries a plurality of rotating table apparatuses 21, each holding a workpiece W, along a predetermined carry track Tr. Here, a rotating table apparatus 21 holding an unprocessed workpiece W is carried into the processing area A1 via a branch point P1 that has been set on the carry track Tr and that leads to the processing area A1, and once processing in the processing area A1 is over, the rotating table apparatus 21 is carried out to the carry track Tr, still holding the processed workpiece W, via the branch point P1.

<Processing Area A1>

As shown in FIG. 1, a horizontal machining center 11 is disposed adjacent to the processing area A1 rearward in the Z direction. The horizontal machining center 11 has a column 12 that can move frontward and backward in the Z direction and a spindle head 13 that is provided on the column 12 and that can move up and down in the Y direction. A tool T is held on a horizontal spindle 14 of the spindle head 13. By moving the tool T in the Z direction and the Y direction with respect to a rotating table apparatus 21 that has been carried into the processing area A1 and that can be moved left and right in the X direction, various types of processing are executed with respect to the workpiece W held by that rotating table apparatus 21. It should be noted that X-direction movement of the rotating table apparatus 21 within the processing area A1 is achieved through a slide guide 18 that is disposed in the X direction on the upper surface of a base 17 of the processing area A1.

A tool magazine 15 storing numerous different types of tools T is disposed adjacent to the horizontal machining center 11 to the left in the X direction, and an automatic tool changing device (ATC) 16 is disposed between the tool magazine 15 and the horizontal machining center 11. The ATC 16 exchanges the tool of the spindle 14 that is done being used for a next tool to be used (not shown) that has been taken out from the tool magazine 15.

It should be noted that a motor 61 serving as the drive source of the rotating table apparatuses 21 and a motor attach-detach device 71 are disposed at the left end in the X direction within the processing area A1, and these will be discussed later.

<Rotating Table Carry Mechanism 81>

The rotating table carry mechanism 81 is disposed adjacent to the processing area A1 to the right in the X direction, and has an annular circulation track Tr that is long in the X direction and that serves as the carry track Tr. The circulation track Tr is made of a rail 83 laid out annularly on a base 82 on the floor surface F and a plurality of moving platforms 84 that are moved guided and supported on the rail 83. On each moving platform 84 is placed a pallet 85 on which a rotating table apparatus 21 is furnished, and by moving the moving platforms 84 along the rail 83, the rotating table apparatuses 21 are carried along with their pallet 85.

It should be noted that slide guides 86 in the X direction are fastened to the upper surface of the moving platforms 84, and a slide block (not shown) that engages the slide guides 86 in a manner that allows sliding movement is fastened to the pallet 85, and as a result, the pallets 85 are guided and supported on the moving platforms 84 in a manner that permits movement in the X direction. Also, the branch point P1 is set at the left end of the circulation track Tr, and when a moving platform 84 has stopped at this branch point P1, the slide guides 86 of that moving platform 84 are in alignment with the slide guides 18 on the upper surface of the base 17 of the processing area A1, as regards their position in the height direction (Y direction) and the Z direction. The pallet 85 positioned at the branch point P1 can therefore be transferred to the slide guides 18 of the processing area A1, and as a result, the rotating table apparatus 21 on the circulation track Tr can be carried into the processing area A1. Of course, a pallet 85 that is in the processing area A1 can be transferred to the slide guides 86 of a moving platform 84 that is stopped at the branch point P1, and thus the rotating table apparatus 21 of the processing area A1 can be carried out to the circulation track Tr.

One example of the drive structure for driving the moving platforms 84 is a structure that is provided with wheels (not shown) rotatively driven by a motor (not shown) and that causes the platforms 84 to self-advance along the rail 83 with these wheels, but structures other than this can also be used.

Figure 2:
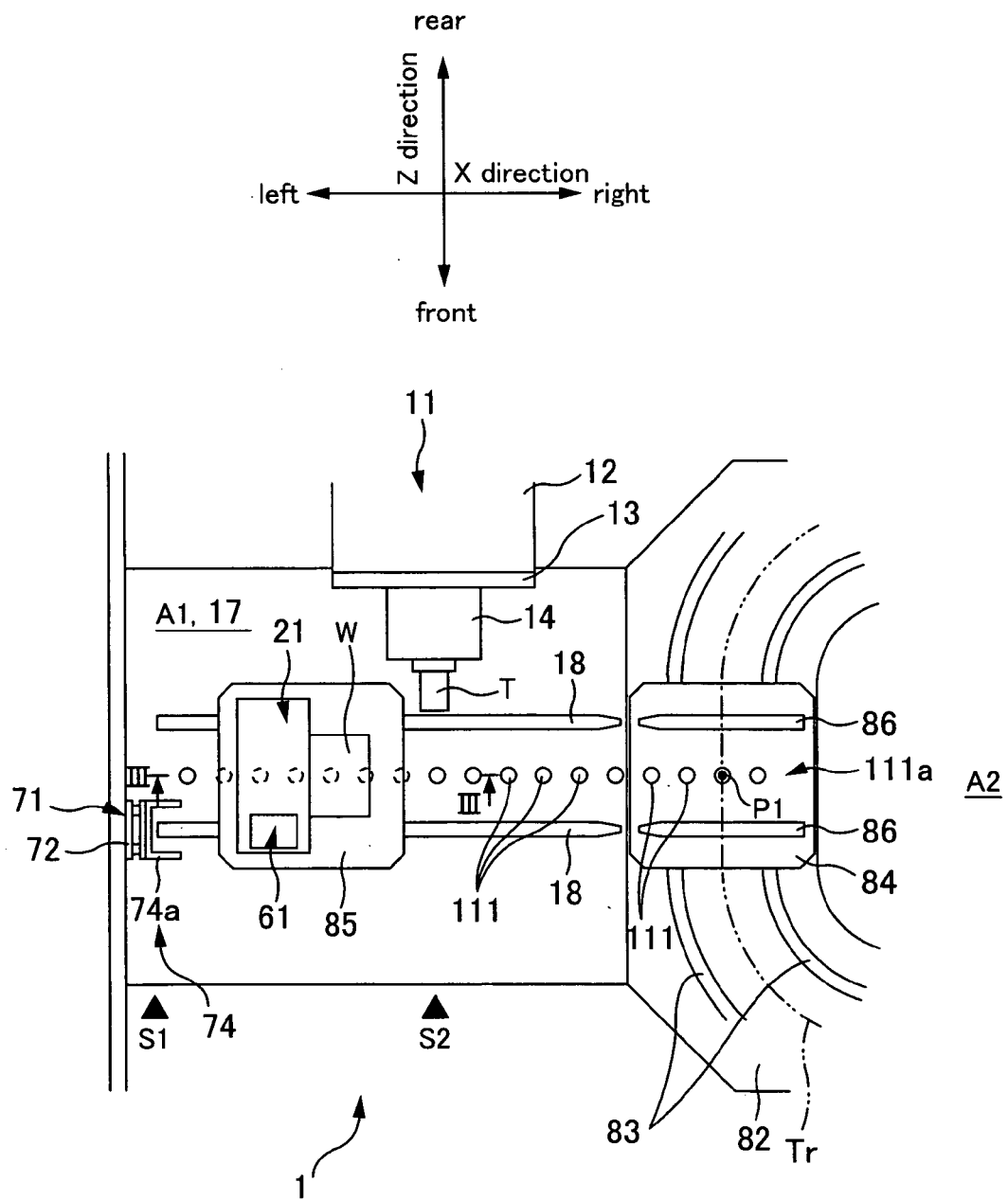
FIG. 2 is a top view illustrating an example of the drive structure of the pallets 85.
Figure 3:
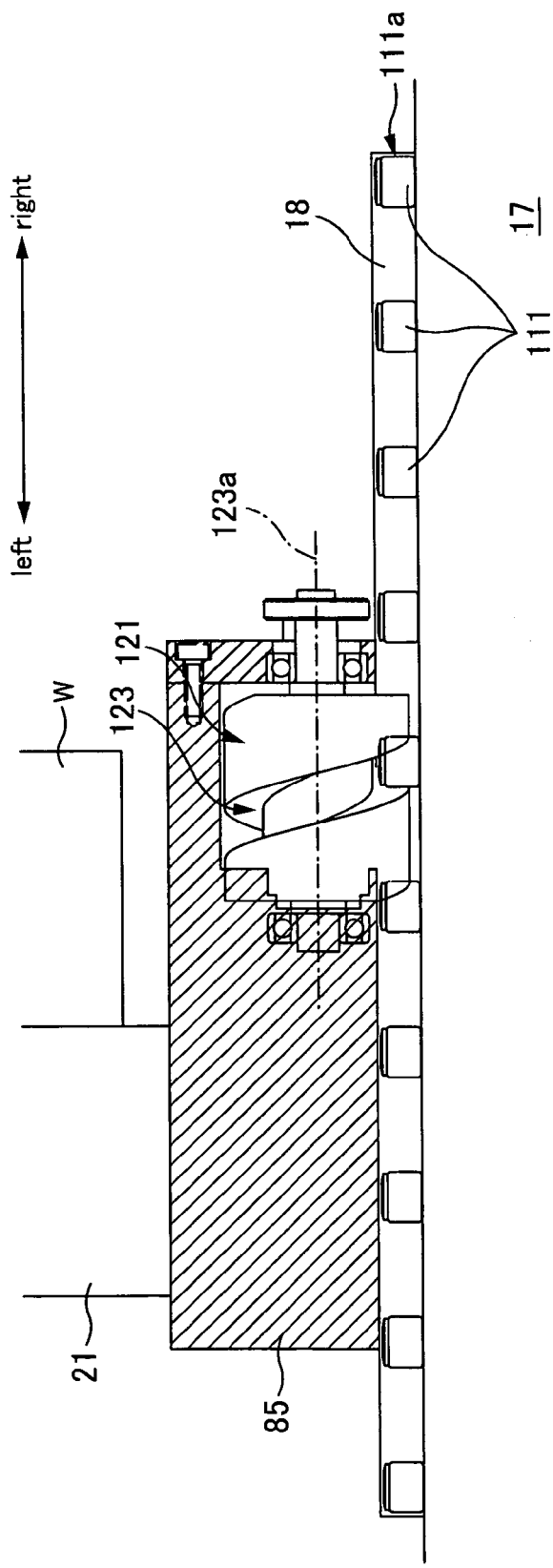
FIG. 3 is a cross section taken in the arrow direction along the line III—III in FIG. 2.

It is also possible to adopt a self-advancing drive structure for the pallets 85 as well. FIG. 2 is a top view of the machine tool 1 for describing an example of this drive structure, and shows a partial view from the processing area A1 up to the branch point P1. FIG. 3 is a sectional view taken in the arrow direction along the line III—III in FIG. 2.

This drive structure is provided with a cam follower row 111a composed of cam followers 111 arranged at a suitable pitch in the X direction on the upper surface of the moving platforms 84 and the upper surface of the base 17 of the processing area A1, and a cylindrical cam 121 whose shaft is rotatably supported on each pallet 85 with its rotation axis 123a in the X direction and that has a roll groove 123 in its outer circumferential surface that engages the cam followers 111 of the cam follower row 111a and moves along them rotatively. With this drive structure, the pallets 85 can be advanced straight forward in the X direction by rotatively driving the cylindrical cam 121 with a motor (not shown) that is fastened to that pallet 85 to let the roll groove 123 rotatively move, in sequence, the cam followers 111 and thereby move over the cam followers 111 in the rotation axis direction.

Incidentally, the rotating table apparatuses 21 in the circulation track Tr are carried with their workpiece W facing toward the inner side of the circulation track Tr as shown in FIG. 1. Consequently, the inner side empty space enclosed by the circulation track Tr can be utilized, for example, as a work area A2 for causing the rotating table apparatuses 21 to hold a workpiece W.

At the branch point P1, the rotating table apparatuses 21 are carried into the processing area A1 positioned to the left of the circulation track Tr with their workpiece W facing inward, that is, facing to the right, and the motor 61 and the motor attach-detach device 71 are disposed at the left end of the processing area A1. The rotating table apparatus 21, the motor 61, and the motor attach-detach device 71 are therefore positioned more toward the left end of the processing area A1 than the workpiece W, and thus these devices 21, 61, and 71 do not interfere whatsoever with the processing task performed by the machining center 11 to the right of the workpiece W.

<Rotating Table Apparatus 21>

Figure 4:
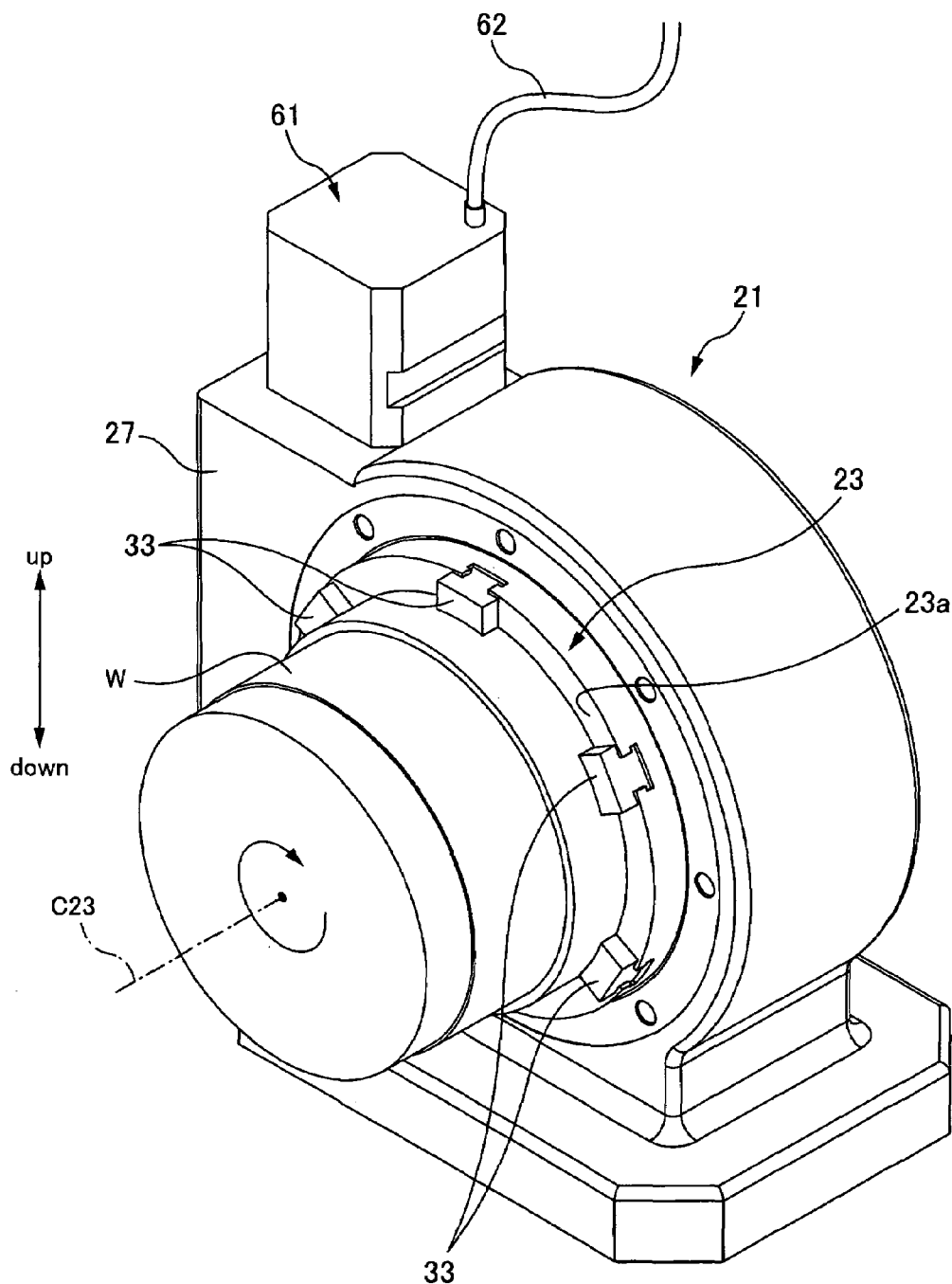
FIG. 4 is a perspective view of a rotating table apparatus 21 when the motor 61 has been connected.
Figure 5:
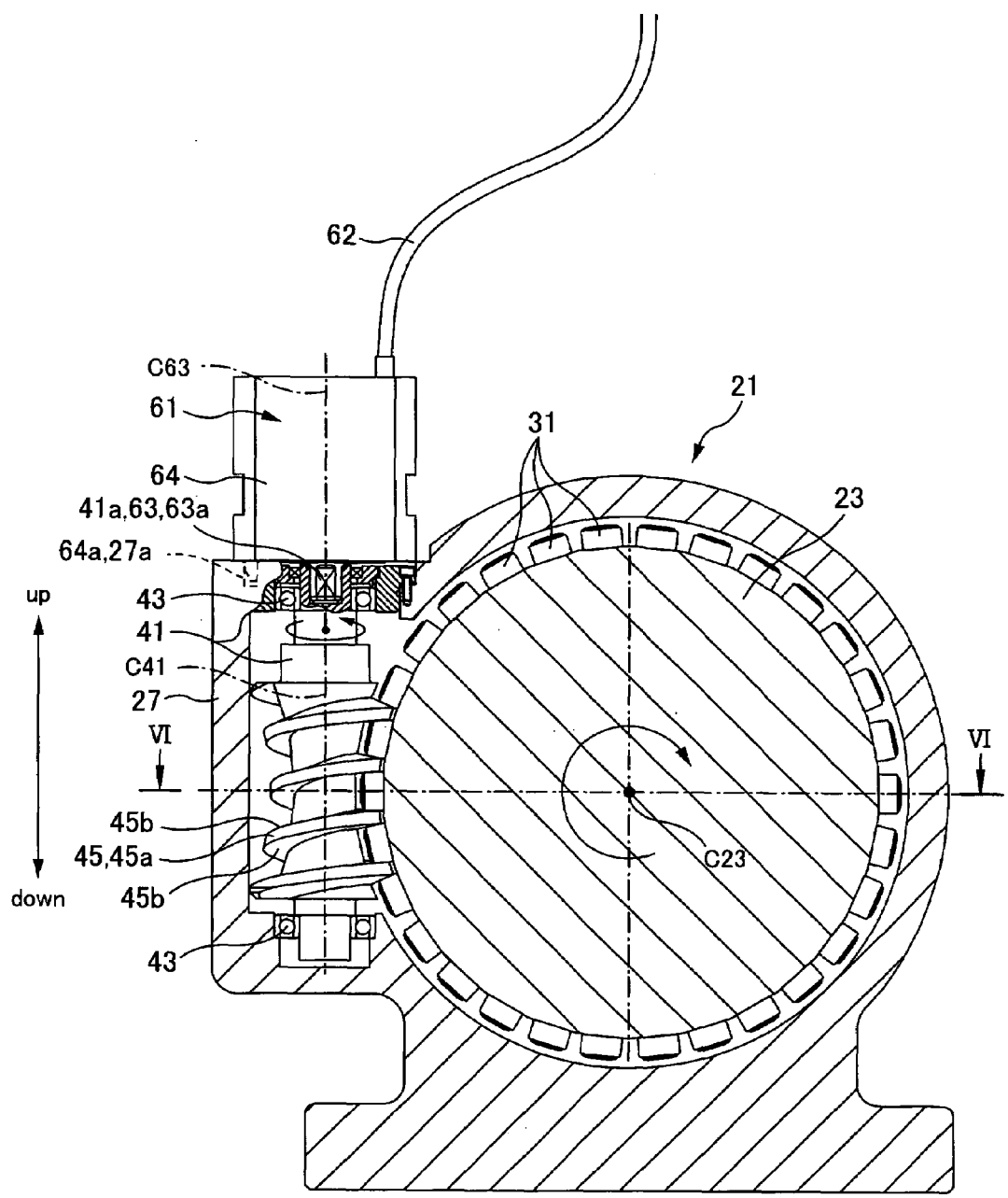
FIG. 5 is a center vertical sectional view of the same.
Figure 6:
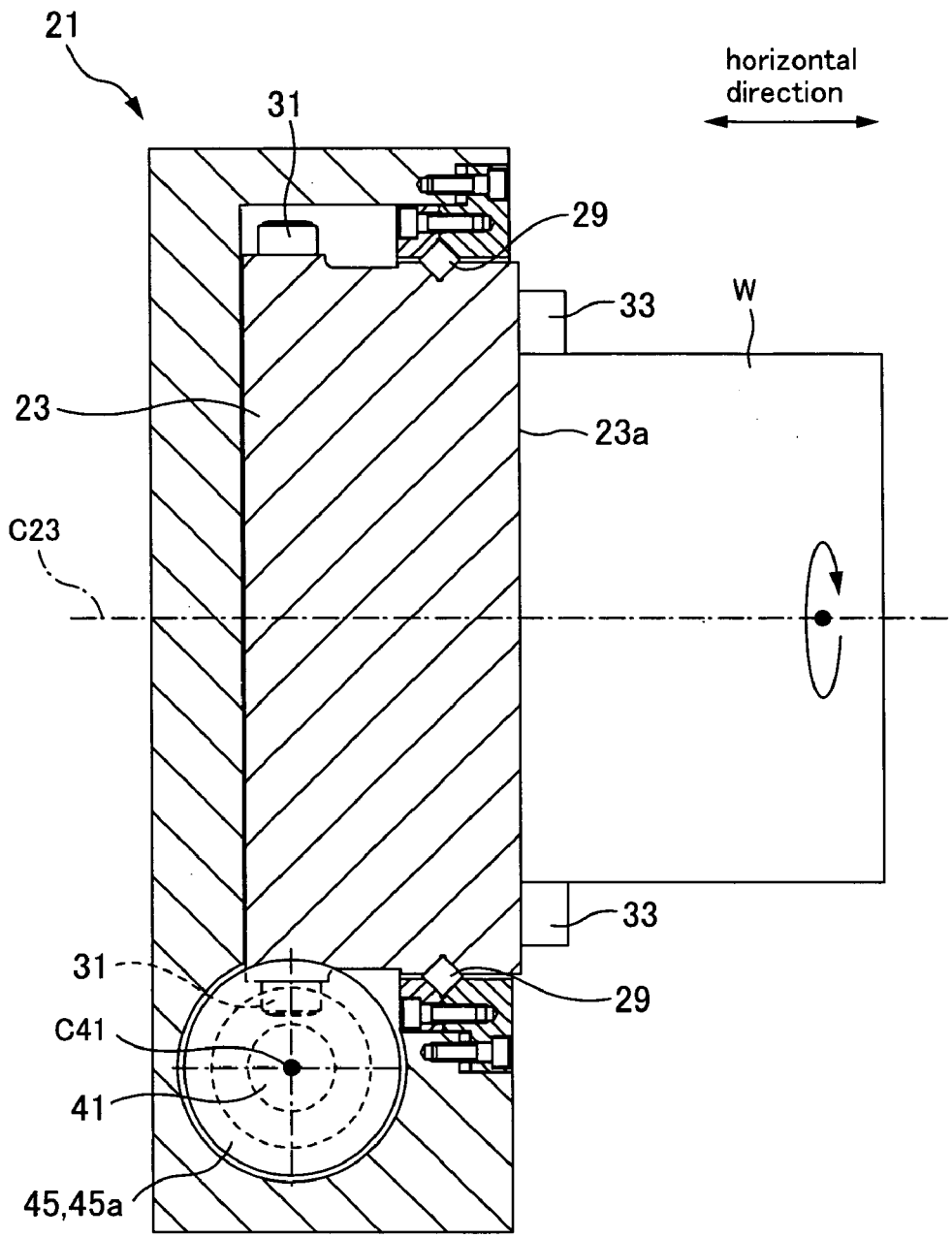
FIG. 6 is a cross section taken in the arrow direction along the line VI—VI in FIG. 5.
Figure 7:
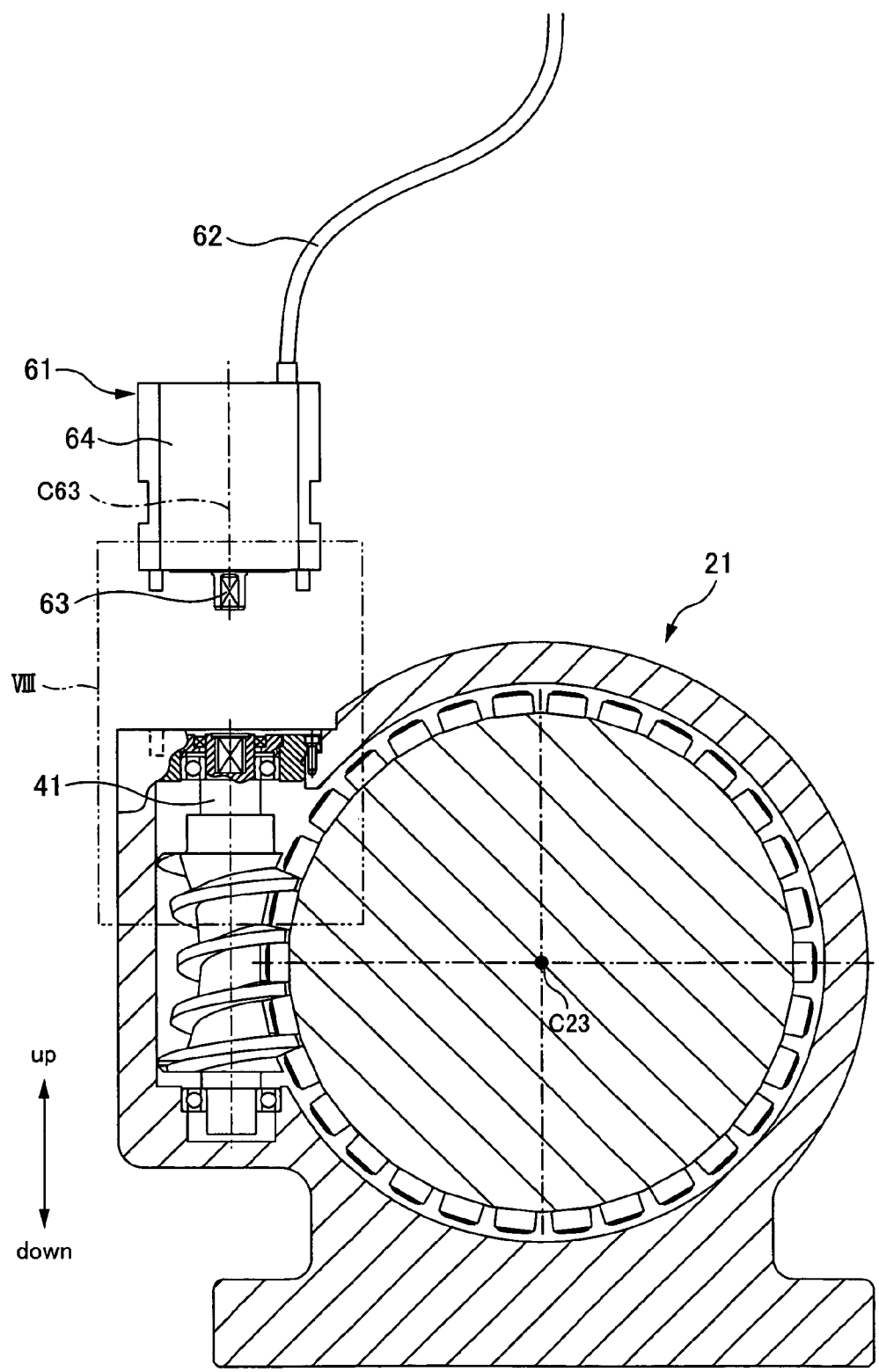
FIG. 7 is a center vertical sectional view of the rotating table apparatus 21 when the motor 61 has been disconnected.

FIGS. 4 to 7 are explanatory diagrams of the rotating table apparatus 21. FIG. 4 is a perspective view of the rotating table apparatus 21 when the motor 61 has been connected, FIG. 5 is a center vertical sectional view through the rotating table apparatus 21, and FIG. 6 is a sectional view taken in the arrow direction along the line VI—VI in FIG. 5. FIG. 7 is a center vertical sectional view of the rotating table apparatus 21 when the motor 61 has been disconnected. It should be noted that in FIG. 5 and FIG. 7, the drive shaft 63 is shown as a side view, and an input shaft 41 etc. is partially shown as a side view.

The rotating table apparatus 21 is provided with a substantially columnar table 23 that can rotate while holding a workpiece W, an input shaft 41 to which a rotational drive force for rotating the table 23 is input, and a housing 27 that rotatably supports the table 23 and the input shaft 41. When the motor 61 of the processing area A1 is connected to the input shaft 41 and a rotational drive force is input, the table 23 is rotated about its axis C23.

More specifically, as shown in FIG. 6, the table 23 is supported on the housing 27 via cross-roller bearings 29 with its axis C23 in the horizontal direction. A plurality of cam followers 31 are provided on the outer circumferential surface of the table 23 at a fixed spacing in the circumferential direction. A chuck 33 for holding a workpiece W is provided on the surface 23a of the table 23.

On the other hand, as shown in FIG. 5, the input shaft 41 is rotatably supported on the housing 27 through a pair of upper and lower ball bearings 43 while its axis C41 is arranged in the vertical direction. The drive shaft 63 of the motor 61 is connected to the upper end section of the input shaft 41 through a first connecting structure, which is discussed later.

A globoidal cam 45 that engages the cam followers 31 is formed in the outer circumferential surface of the input shaft 41. That is, a rib 45a is formed in a helix in the outer circumferential surface of the input shat 41, and the cam followers 31 mesh with this rib 45a. The position where the rib 45a is formed is shifted vertically in the axial direction along the circumferential direction of the input shaft 41, and thus in conjunction with the rotation of the globoidal cam 45 that results when the input shaft 41 is rotatively driven by the motor 61, the cam followers 31 that mesh with the rib 45a are sequentially moved in the circumferential direction of the table 23, thereby rotating the table 23 about its horizontal central axis C23.

It should be mentioned that in this meshing state, the lateral surfaces 45b of the rib 45a are sandwiched by a cam follower 31 and either the adjacent or next adjacent cam follower 31. This results in a structure that does not allow backlash between the cam followers 31 and the rib 45a, and therefore through the cam followers 31, the table 23 can be made to perform a planned rotation as expressed by the rib 45a.

Further, this sandwiching structure permits high-precision rotation of the table 23 even when the rotation load of table 23 is large, and thus the rotating table apparatus 21 can also be adopted as the spindle of a lathe, in which there is a large rotation load.

<Motor 61 Connected to the Rotating Table Apparatus 21 and Motor Attach-Detach Device 71>

The motor 61 is disposed in the processing area A1 shown in FIG. 1. As shown in FIG. 1 and FIG. 5, the motor 61 functions as a drive source that is connected to the rotating table apparatus 21 that has been carried into the processing area A1, and is disconnected from the rotating table apparatus 21 as shown in FIG. 7 when processing of the workpiece W is finished and the rotating table apparatus 21 is to be carried out of the processing area A1. Consequently, as shown in FIG. 1, the rotating table apparatus 21 is not provided with the motor 61 when it is in a location other than the processing area A1, and this makes it possible to preclude the problem of the power cable 62 associated with the motor 61 becoming tangled when carrying the rotating table apparatus 21.

As shown in FIG. 7, the motor 61 is provided with a casing 64, which is a component on the stator side, and the drive shaft 63, which is a component on the rotor side that is axially supported on the casing 64 in a rotatable manner. The drive shaft 63 rotates about the axis C63 when power is supplied from the associated power cable 62.

The axis C63 of the drive shaft 63 is in the vertical direction and therefore the lower end section of the drive shaft 63 is connected to the upper end section of the input shaft 41 of the rotating table apparatus 21 through the first connecting structure with their rotation axes in alignment.

Figure 8:
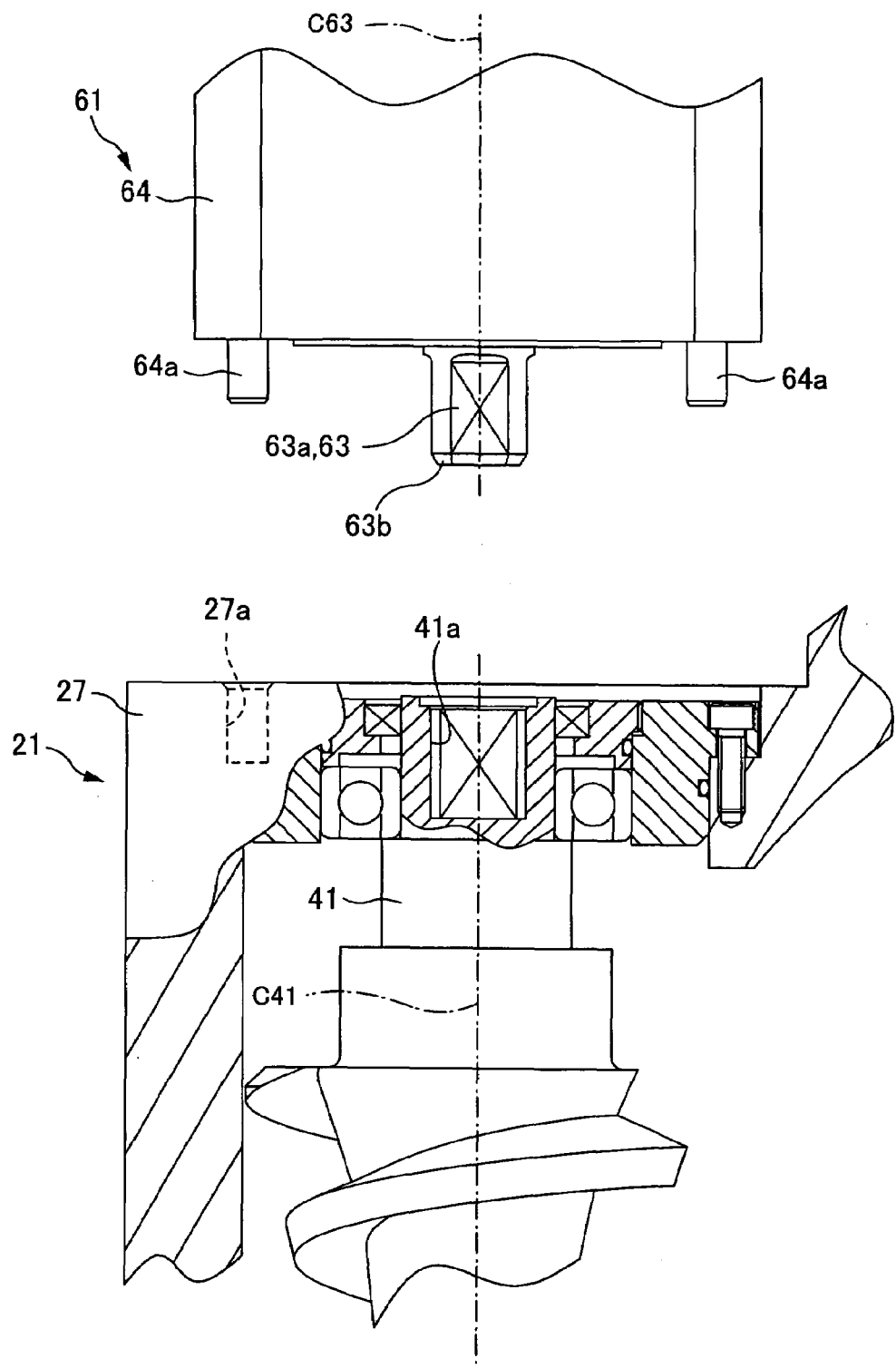
FIG. 8 is a magnified view of section VIII in FIG. 7.

FIG. 8 shows a magnification of the VIII portion in FIG. 7. The first connecting structure is a so-called spline fitting, and in the example shown in the diagrams, a fitting projection 63a is formed on the driveshaft 63 of the motor 61 with its rotation center in alignment with the axis C63, and a fitting depression 41a is formed in the input shaft 41 of the rotating table apparatus 21 with its rotation center in alignment with the axis C41. In the process of lowering the motor 61 with respect to the rotating table apparatus 21 positioned below it and placing it on the upper surface of the housing 27, the fitting projection 63a of the drive shaft 63 is fitted into to the fitting depression 41a of the input shaft 41, thereby connecting the two.

It should be noted that the horizontal cross-sectional shape of the fitting projection 63a and the fitting depression 41a are both rectangular, and thus in the connected state, relative rotation about the axis C41 is restricted and therefore the rotational drive force of the motor 61 can be input to the rotating table apparatus 21.

The peripheral portion 63b of the fitting projection 63a has been chamfered so that at the time of fitting, slight shifting between the two with regard to the position of their axes and their rotation angles is permitted, and this allows the fitting projection 63a to be quickly guided into the fitting depression 41a.

When the drive shaft 63 of the motor 61 rotatively drives, the casing 64 of the motor 61 receives a rotation counterforce in the direction opposite to the rotation direction. When the casing 64 cannot withstand this rotation counterforce and moves as a result, the rotation operation precision of the drive shaft 63 becomes poor. Here, examples of an opposition force for opposing this rotation counterforce include the friction resistance that acts on the abutting surface between the casing 64 and the housing 27 due to the weight of the motor 61. However, if the rotation counterforce is larger than this friction resistance, then the friction resistance would not be sufficient as an opposition force. Therefore, in this first embodiment, a second connecting structure for non-rotatably connecting the casing 64 and the housing 27 has been provided. As shown in FIG. 8, the second connecting structure has a plurality of rotation stop pins (engagement projections) 64a provided protruding from the lower end surface of the casing 64, and pin holes (engagement depressions) 27a formed in the upper end surface of the housing 27 in correspondence with the rotation stop pins 64a. When these have engaged one another, the casing 64 is held on the housing 27, and thus it is possible to effectively oppose the rotation counterforce.

Figure 9:
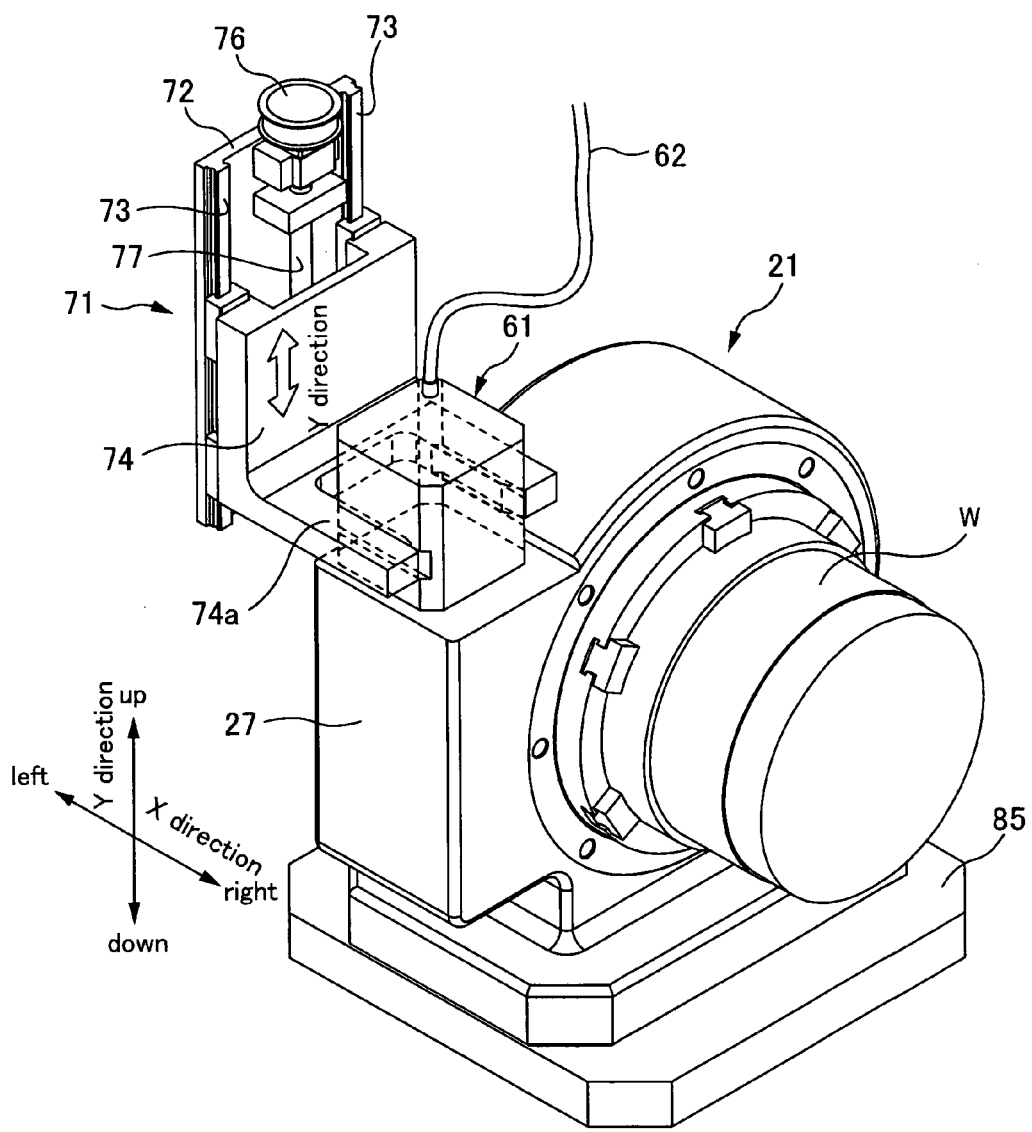
FIG. 9 is a perspective view showing how the rotating table apparatus 21 and the motor 61 are connected by the motor attach-detach device 71.

Attaching and detaching the motor 61 to and from the rotating table apparatus 21 (that is, the "connecting" and "disconnecting" actions mentioned above) is carried out by the motor attach-detach device 71 disposed in the processing area A1. FIG. 9 shows a state in which the rotating table apparatus 21 and the motor 61 are connected by the motor attach-detach device 71.

The motor attach-detach device 71 is provided with a main unit 72 that is fastened to the processing area A1 and a grasping section 74 that is guided and supported on the main unit 72 through a linear guide 73 in such a manner that it can be raised and lowered in the fitting direction. A U-shaped arm 74a that opens and closes is provided at the front end in the X direction of the grasping section 74, and by the arm 74a opening and closing with the motor 61 positioned within it, the arm 74a clasps and releases the motor 61.

It should be noted that a feed screw mechanism provided with a motor 76, for example, can be adopted as the drive mechanism for raising and lowering the grasping section 74. That is, a male screw 77 whose axis is aligned in the up-down direction is provided on the main unit 72 of the motor attach-detach device 71 such that its shaft is rotatably supported thereby, and a female screw (not shown) is fastened to the grasping section 74 and mates with the male screw 77. Thus, when the male screw 77 is rotated due to rotation of the motor 76, the female screw that is mated with the male screw 77 is moved in the up-down direction, which is the axial direction, and thus the grasping section 74 can be raised and lowered.

With this motor attach-detach device 71, the motor 61 is attached and detached as follows.

First, as shown in FIG. 2, the rotating table apparatus 21 that has been carried into the processing area A1 is moved up to a motor attach-detach position S1 set at the left end in the X direction by its self-advancing pallet 85. Then, the motor attach-detach device 71 disposed at the motor attach-detach position S1 lowers the grasping section 74, which has grasped the motor 61, from an upper standby position to place the motor 61 on the upper surface of the housing 27 of the rotating table apparatus 21 as shown in FIG. 9, and stops when the motor is placed thereon. It should be noted that in the course of this lowering, as shown in FIG. 5 the fitting projection 63a of the drive shaft 63 of the motor 61 is fitted into the fitting depression 41a of the input shaft 41 of the rotating table apparatus 21, and the rotation stop pins 64a of the casing 64 of the motor 61 are inserted into the pin holes 27a of the housing 27 of the rotating table apparatus 21. The positional relationship at which this fitting etc. takes place is achieved by suitably adjusting the position where the motor attach-detach device 71 is arranged in the horizontal plane.

Then, maintaining the state shown in FIG. 9, the arm 74a of the grasping section 74 is opened to release the motor 61 and then the grasping section 74 is returned to the upper standby position, and with this, the operation of connecting the motor 61 to the rotating table apparatus 21 is completed.

Then, as shown in FIG. 2, the rotating table apparatus 21 to which the motor 61 has been mounted is moved in the X direction up to a processing position S2 on the right side, where the tool T of the machining center 11 is located, and the task of processing the workpiece W with the machining center 11 is started. It should be noted that at this time, as shown in FIG. 4, the rotating table apparatus 21 receives rotational drive force from the motor 61 and rotates the table 23. If at this time the table 23 is rotated continuously, then it is possible to machine the workpiece W like a lathe, and if the table 23 is rotated intermittently, then it is possible to mill a plurality of processing surfaces of the workpiece W like a milling machine. It should be noted that whether the setting is for continuous rotation or intermittent rotation is determined by the design of the rib shape of the globoidal cam.

Once this processing task has finished, then, as shown in FIG. 2, the rotating table apparatus 21 is again moved to the motor attach-detach position S1 at the left end in the X direction. The motor attach-detach device 71 then lowers the grasping section 74 in the standby position to the above-described stop position as shown in FIG. 9 and closes the arm 74a of the grasping section 74 to clasp the motor 61. The grasping section 74 is then raised in that state to the standby position. It should be noted that in the course of this upward lifting, as shown in FIG. 8, the fitting projection 63a is withdrawn from the fitting depression 41a and the rotation stop pins 64a are withdrawn from the pin holes 27a, thereby disconnecting the motor 61 from the rotating table apparatus 21, and with this, the operation of disconnecting the motor 61 from the rotating table apparatus 21 is completed. The rotating table apparatus 21 from which the motor 61 has been disconnected is then moved to the right in the X direction and transferred to the moving platform 84 waiting for it at the branch point P1 shown in FIG. 2, thus carrying the rotating table apparatus 21 out of the processing area A1 to the circulation track Tr.

===Second Embodiment of the Machine Tool===

With the connecting structures in the first embodiment, there was a possibility that the motor 61 would detach from the rotating table apparatus 21 if an external force in the upward direction greater than the weight of the motor 61 acted on the motor 61. The connecting structure of this second embodiment is different from that of the first embodiment primarily in that it has a detach-stop structure for preventing such detaching.

Figure 10:
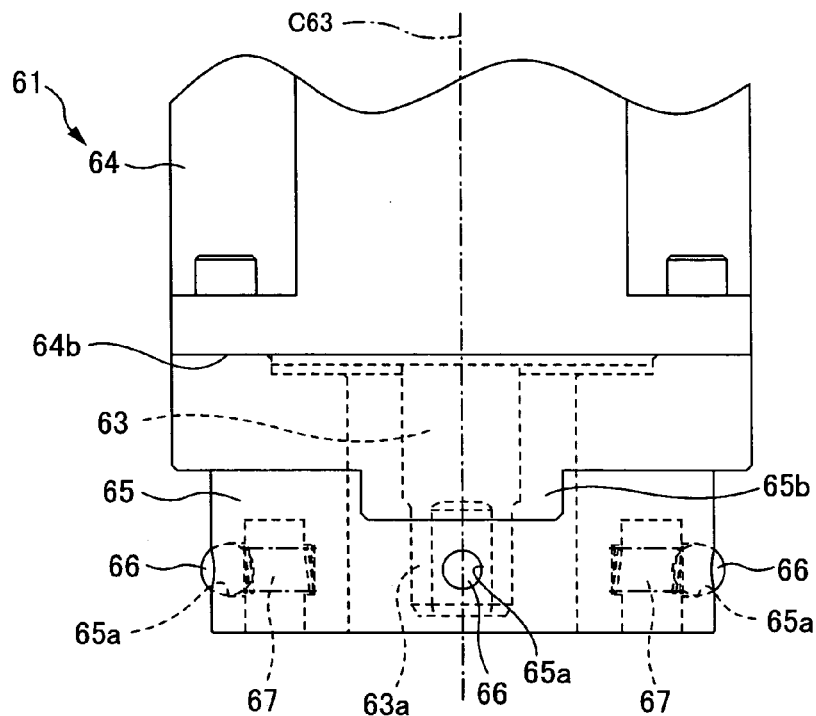
FIG. 10 is a lateral view showing the outer appearance of the connecting structure according to a second embodiment.
Figure 10:
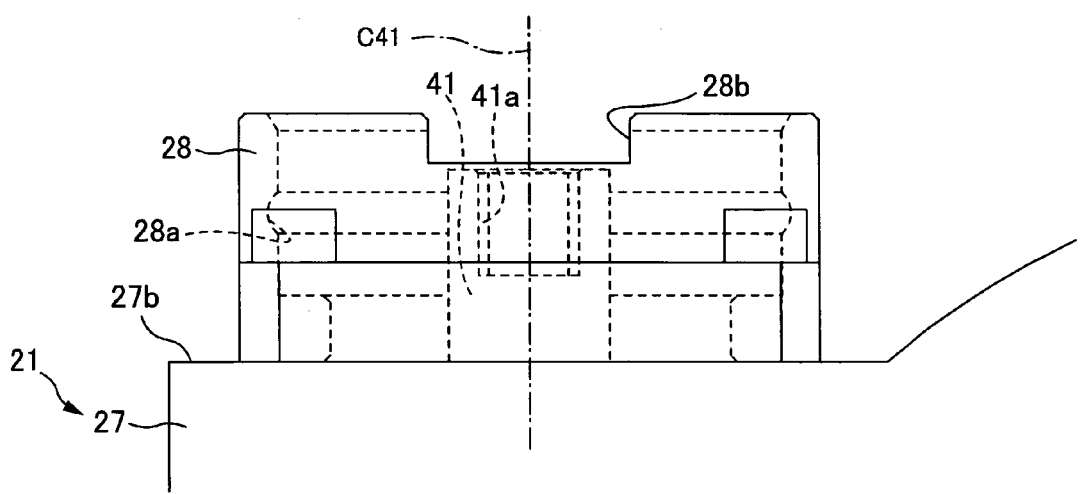
Figure 11:
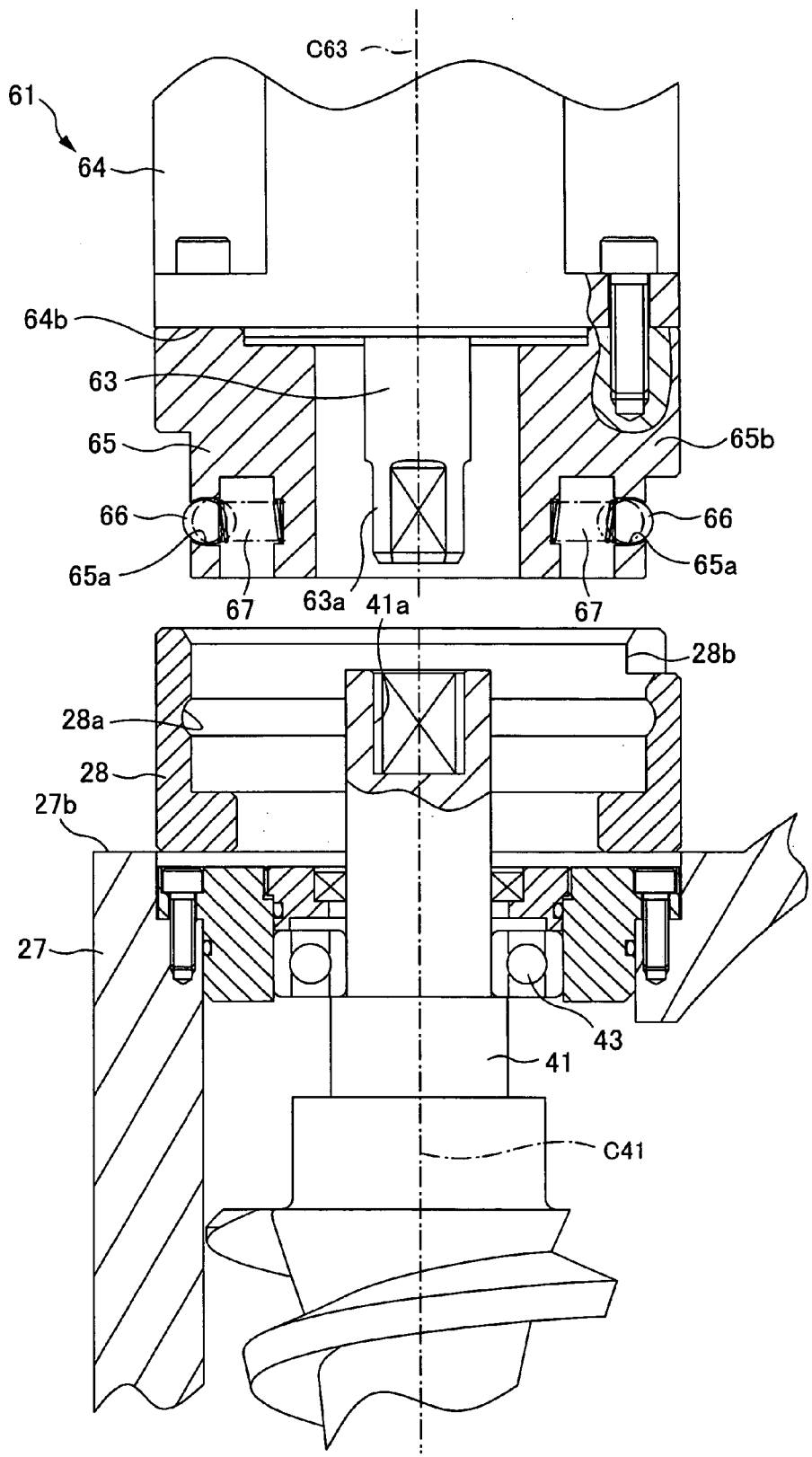
FIG. 11 is a center vertical sectional view of the same.
Figure 12:
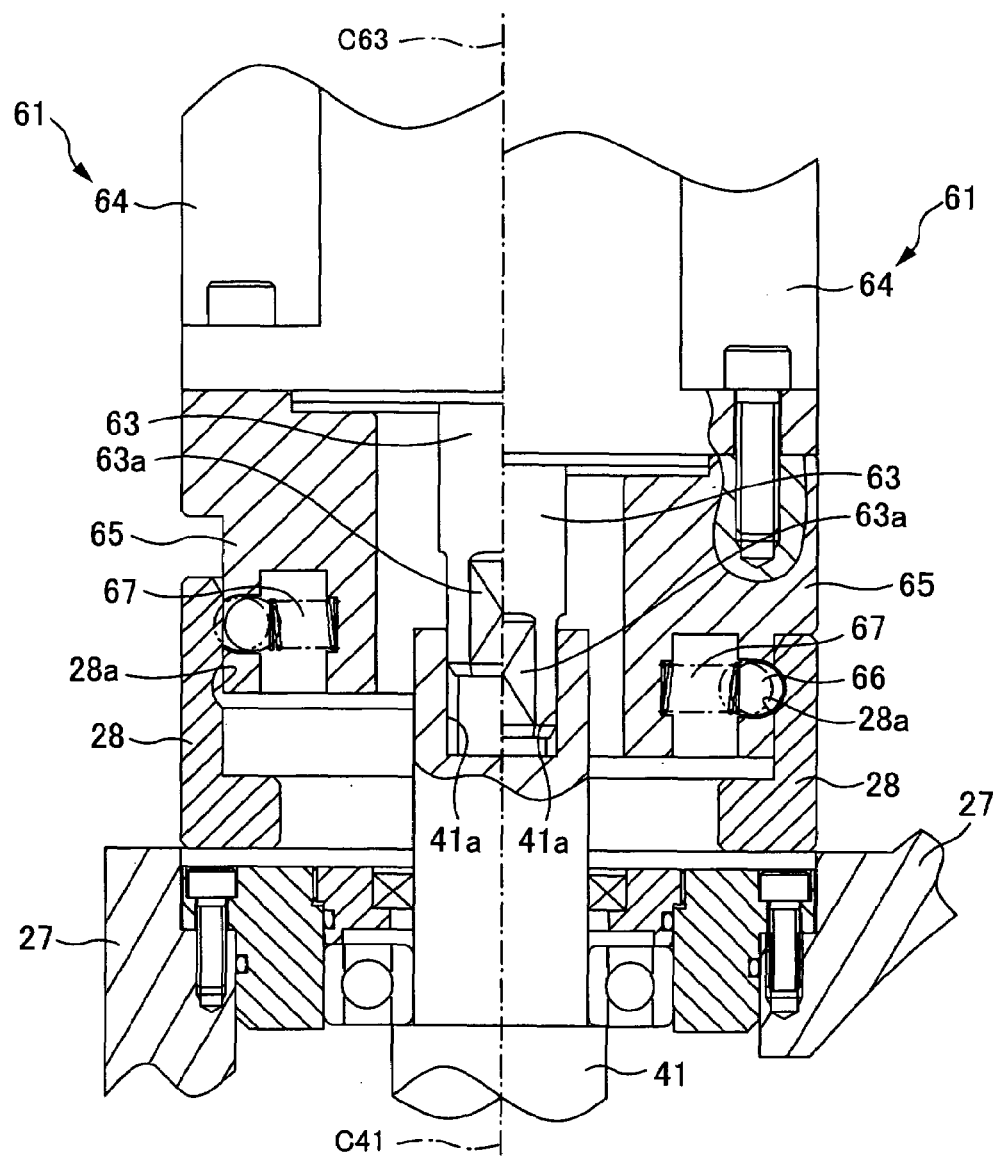
FIG. 12 is a center vertical sectional view showing the connection process.

FIGS. 10 to 12 are explanatory diagrams of the connecting structures according to the second embodiment. FIG. 10 is a lateral view showing the external appearance of the connecting structure, and FIG. 11 is a center vertical sectional view of the same. Also, FIG. 12 is a center vertical sectional view showing the connection process; in its left half the state immediately prior to connection is shown, and in its right half the connected state is shown. It should be noted that in FIG. 11 and FIG. 12 the drive shaft 63 is shown as a side view, and the input shaft 41 etc. is partially shown as a side view. Structural elements that are identical to those of the connecting structures according to the first embodiment are shown assigned identical reference numerals and description thereof is omitted.

As shown in FIG. 10 and FIG. 11, the casing 64 of the motor 61 according to the second embodiment has a cylindrical section (hereinafter, referred to as "small-diameter cylindrical section") 65 that protrudes from its lower end surface 64b coaxial with the drive shaft 63, and a cylindrical section (hereinafter, referred to as "large-diameter cylindrical section") 28 that can accommodate the small-diameter cylindrical section 65 within it is fastened to the upper end surface 27b of the housing 27 of the rotating table apparatus 21. When the motor 61 and the rotating table apparatus 21 have been connected, the small-diameter cylindrical section 65 is inserted into the large-diameter cylindrical section 28. It should be mentioned here that the large-diameter cylindrical section 28 and the small-diameter cylindrical section 65 function as guide members that correct deviation in the axial positions of the drive shaft 63 and the input shaft 41 when the fitting projection 63a of the drive shaft 63 is fitted into the fitting depression 41a of the input shaft 41.

A plurality of circular holes 65a are formed in the small-diameter cylindrical section 65 in the circumferential direction at a suitable pitch, and a spherical ball (engagement member) 66 is buried in each circular hole 65a in such a manner that it can move in the radial direction of the small-diameter cylindrical section 65. Coil springs (pushing members) 67 are disposed, at a portion more inward in the radial direction than the balls 66, in a radial fashion with the direction in which they expand and contract in alignment with the radial direction, and apply an elastic force in the pressing direction outward in the radial direction to the balls 66. Thus, the balls 66, as shown by the long-short dashed lines in FIG. 11, are buried in the circular holes 65a in correspondence with the external force acting on them inward in the radial direction, and if no external force is present, then a portion of the balls 66 protrudes from the circular hole 65a. It should be noted that the circular holes 65a have a smaller diameter than the balls 66 at the outer circumferential surface of the small-diameter cylindrical section 65, and thus the balls 66 are prevented from dropping outward from the circular holes 65a.

On the other hand, an annular engagement groove 28a is formed in the circumferential direction in the inner circumferential surface of the large-diameter cylindrical section 28. In the connected state shown in the right half of FIG. 12, the balls 66 and the engagement groove 28a are in opposition to one another and the balls 66 are pushed by the coil springs 67 into and engage the engagement groove 28a. This engaging prevents the motor 61 connected to the rotating table apparatus 21 from easily detaching, and thus the connected state can be made more stable.

That is, even if in the connected state the motor 61 is lifted up by an external force equal to its own weight, the engagement is not disrupted, and thus the motor 61 cannot be removed from the rotating table apparatus 21, and this stabilizes the connected state. However, the motor 61 can be removed by lifting up the motor with an external force that is capable of pushing the balls 66 into the small-diameter cylindrical sections 65 against the elastic force of the coil springs 67.

It can be understood from FIG. 10 that in the second embodiment, the rotation stop pins 64a and the pin holes 27a, which were furnished in the first embodiment, are not provided, and in place of the rotation stop pins 64a etc., a rotation stop member is formed integrally with the small-diameter cylindrical section 65 and the large-diameter cylindrical section 28. The rotation stop member is made of a projection 65b that is provided integrally with the outer circumferential surface of the small-diameter cylindrical section 65, and a depression 28b that is formed by cutting out the large-diameter cylindrical section 28 to Correspond to the projection 65b. In the connected state shown in FIG. 12, the projection 65b and the depression 28b are fitted into one another, thus restricting relative rotation between the casing 64 of the motor 61 and the housing 27 of the rotating table apparatus 21.

===Third Embodiment of the Machine Tool===

With the connecting structure according to the second embodiment, the coil springs 67 of the detach-stop structure are disposed such that the direction in which they expand and contract is in alignment with the radial direction of the small-diameter cylindrical section 65 as shown in FIG. 10. In this case, the wall of the small-diameter cylindrical section 65 must be kept thick if the coil springs 67 are to be accommodated within the small-diameter cylindrical section 65, and this may result in the radial-direction dimensions becoming large.

Figure 13:
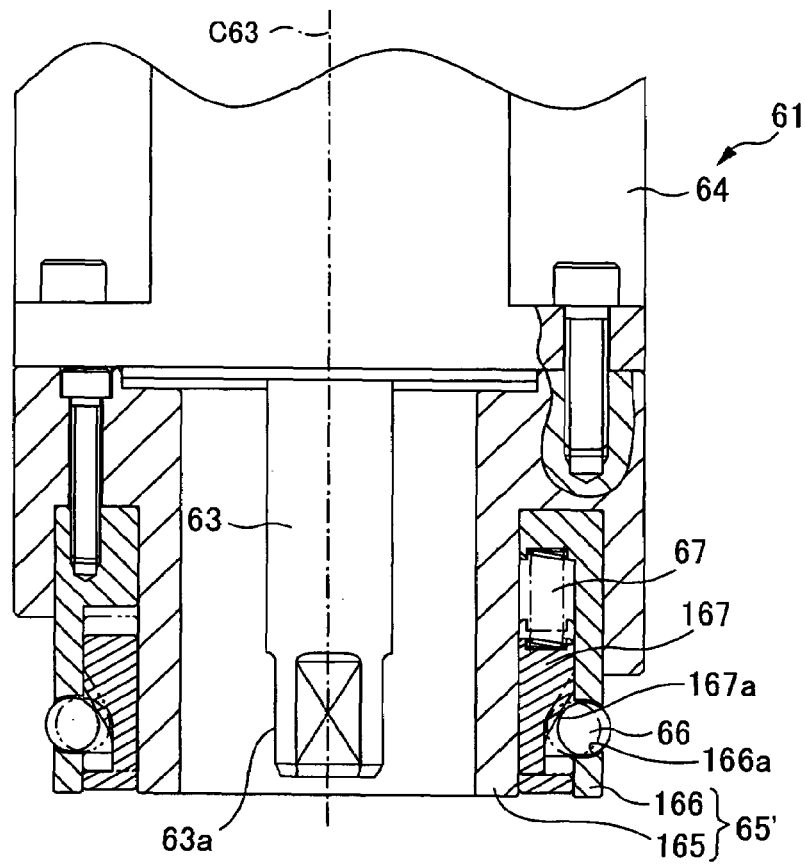
FIG. 13 is a center vertical sectional view of the connecting structure according to a third embodiment.
Figure 13:
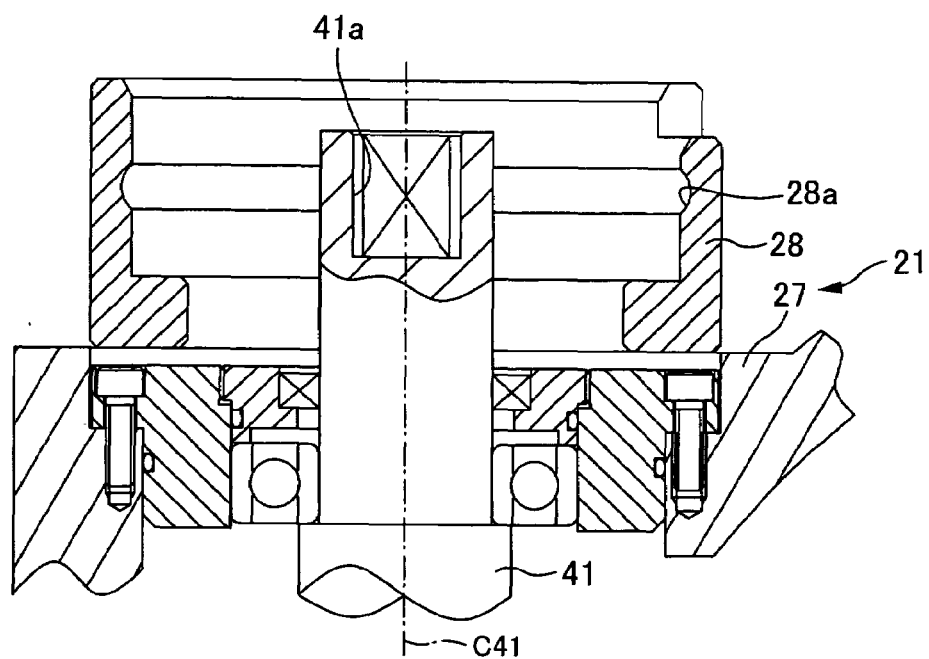

The connecting structure according to this third embodiment provides an improvement, that is, the coil springs 67 are disposed so that the direction in which they expand and contract is parallel to the axial direction of the small-diameter cylindrical section 65 (see FIG. 13). As a result, a small-diameter cylindrical section 65 that is more compact in the radial direction can be achieved.

Figure 14:
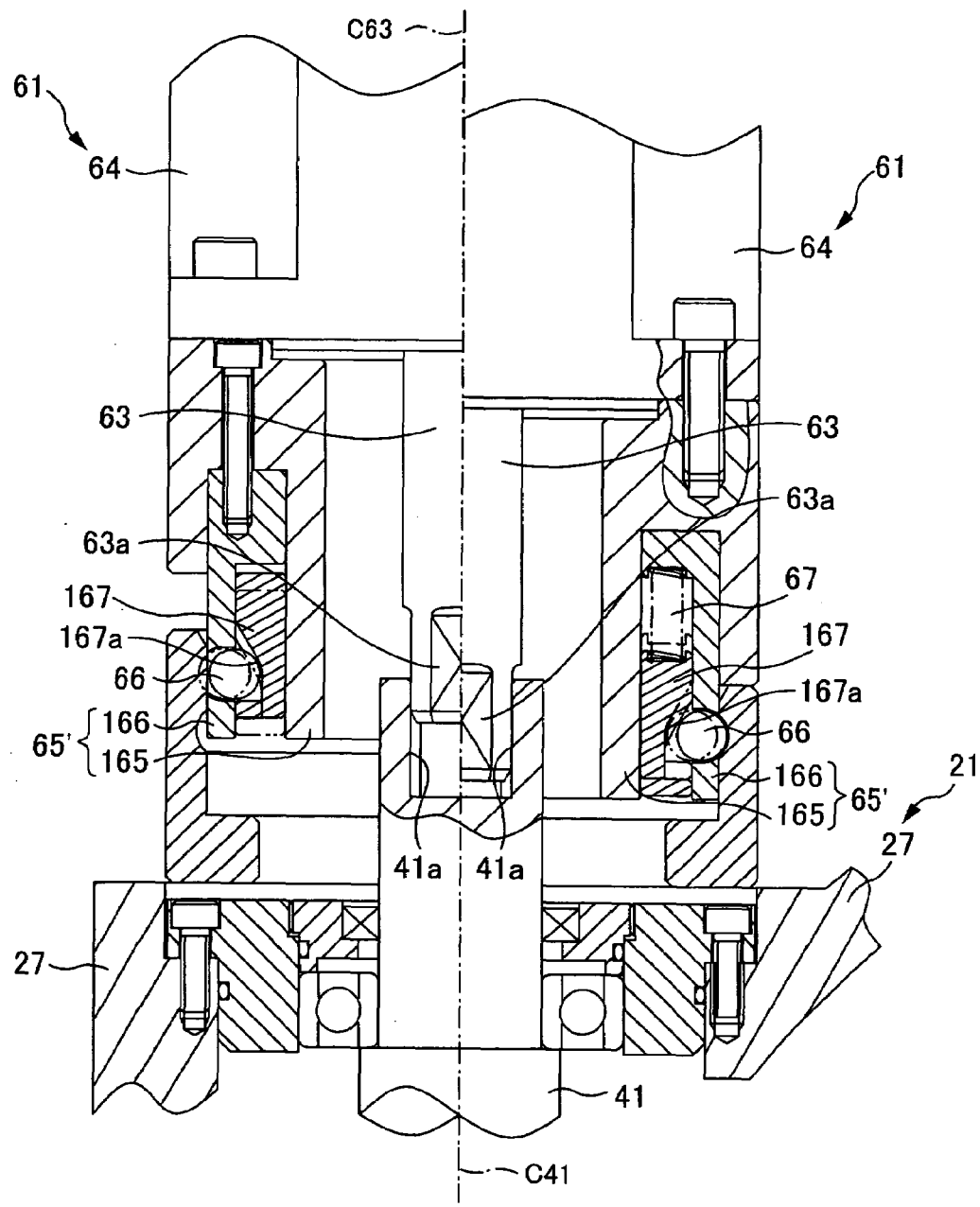
FIG. 14 is a center vertical sectional view showing the connection process.

FIG. 13 and FIG. 14 are explanatory diagrams of the connecting structure according to this third embodiment. FIG. 13 is a center vertical sectional view of the connecting structure. FIG. 14 is a center vertical sectional view showing the connecting process; in its left half the state immediately prior to connection is shown, and in its right half the connected state is shown. It should be noted that in FIG. 13 and FIG. 14 the drive shaft 63 is shown as a side view, and the input shaft 41 etc. is partially shown as a side view. Sections that are identical to those of the connecting structure of the second embodiment are assigned identical reference numerals and description thereof is omitted.

As shown in FIG. 13 and FIG. 14, a small-diameter cylindrical section 65' of the motor 61 according to the third embodiment has a double cylinder shape, that is, it has an inner cylinder section 165 and an outer cylinder section 166 that covers the outer circumferential surface of the inner cylinder section 165. A cylindrical elastic-force transmission member 167 for changing the direction of the elastic force of the coil spring 67 from the axial direction to the radially-outward direction and transmitting this elastic force to the ball 66 is interposed in a space between the inner cylinder section 165 and the outer cylinder section 166. In this interposed state, there is a predetermined amount of play, and thus the transmission member 167 can move up and down in the axial direction. A taper section 167a whose diameter is tapered downward is formed in the outer circumferential surface of the transmission member 167.

The balls 66 are provided buried in circular holes 166a in the outer cylinder section 166, and like in the second embodiment discussed above, the balls can move outward until a portion thereof protrudes from the outer circumferential surface of the outer cylinder section 166. The transmission member 167 is arranged such that its taper section 167a abuts against the balls 66, and a downward elastic force is applied onto the upper end surface of the transmission member 167 from the coil spring 67 disposed above it. Accordingly, when the transmission member 167 is pressed downward and moved due to this elastic force, the taper section 167*a* pushes the balls 66 outward and thus changes the direction of the elastic force of the coil spring 67 from the axial direction to the radially-outward direction.

Figure 15:
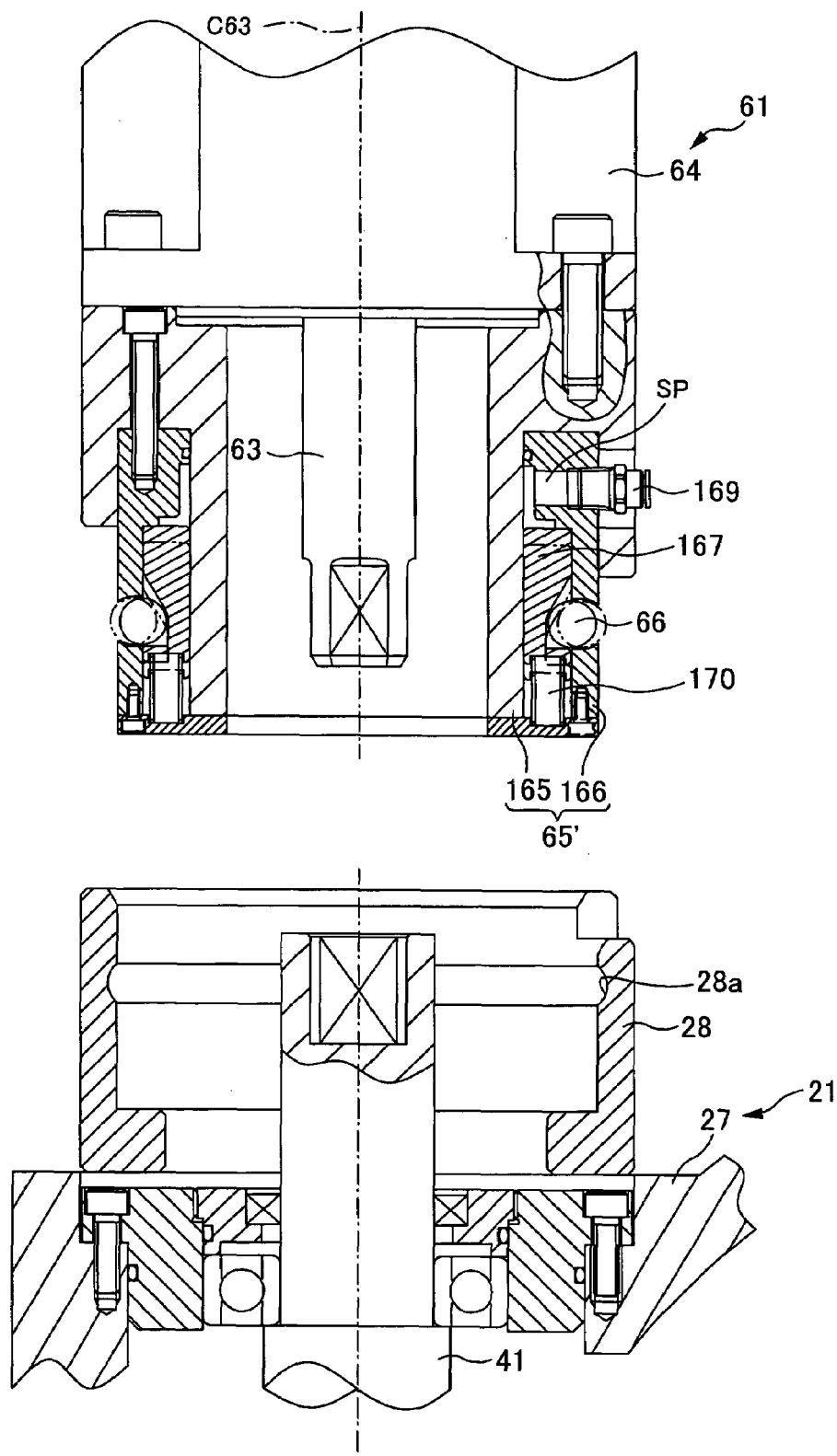
FIG. 15 is a center vertical sectional view of another connecting structure according to the third embodiment.
Figure 16:
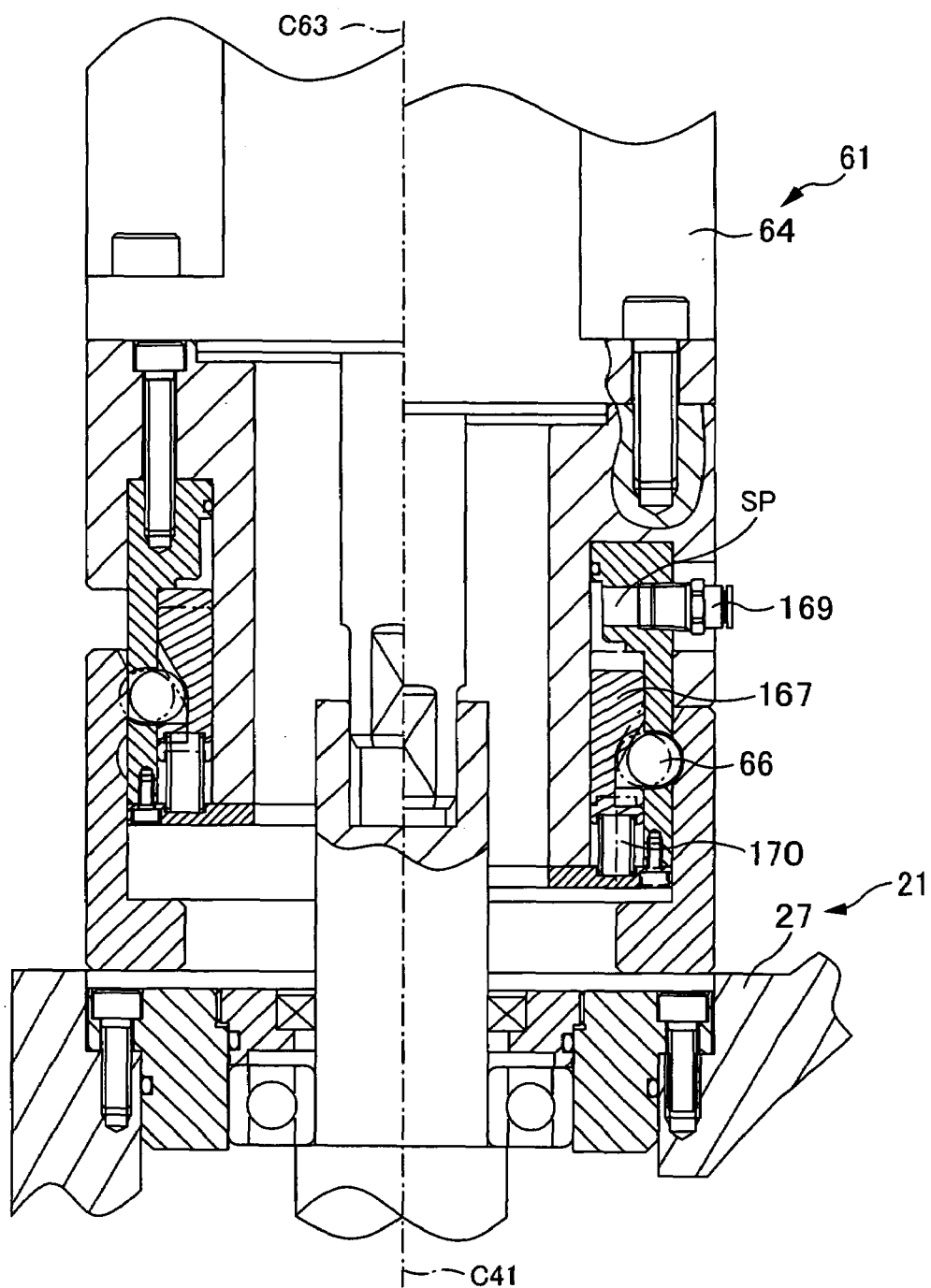
FIG. 16 is a center vertical sectional view showing the connection process.

It should be noted that the member that applies downward force to the transmission member 167 is not limited to a solid element such as the coil spring 67. For example, as shown in FIG. 15 and FIG. 16, it is also possible to apply downward force to the transmission member 167 through pressure exerted by a liquid or a gas, such as oil or air, by communicating an oil pressure system or a gas pressure system to the space SP in which the coil spring 67 had been disposed. It should be noted that in this example shown, a one-touch joint 169 for connecting a hose member that functions as the above-described system is provided in the space SP. A coil spring 170 for returning the transmission member 167 to its original position, which is above the transmission member 167, when pressure is removed is disposed at the lower end of the transmission member 167.

===Fourth Embodiment of the Machine Tool===

In the connecting structure according to the first embodiment, the peripheral portion of the fitting projection 63*a* of the drive shaft 63 has been chamfered so that, when fitting into the fitting depression 41*a* of the input shaft 41, slight deviation in the axial positions or the rotation angle between the two can be permitted and the fitting projection 63*a* can be quickly guided into the fitting depression 41*a*. The fourth embodiment is an improvement in that the tolerance of this deviation is increased further.

Figure 17:
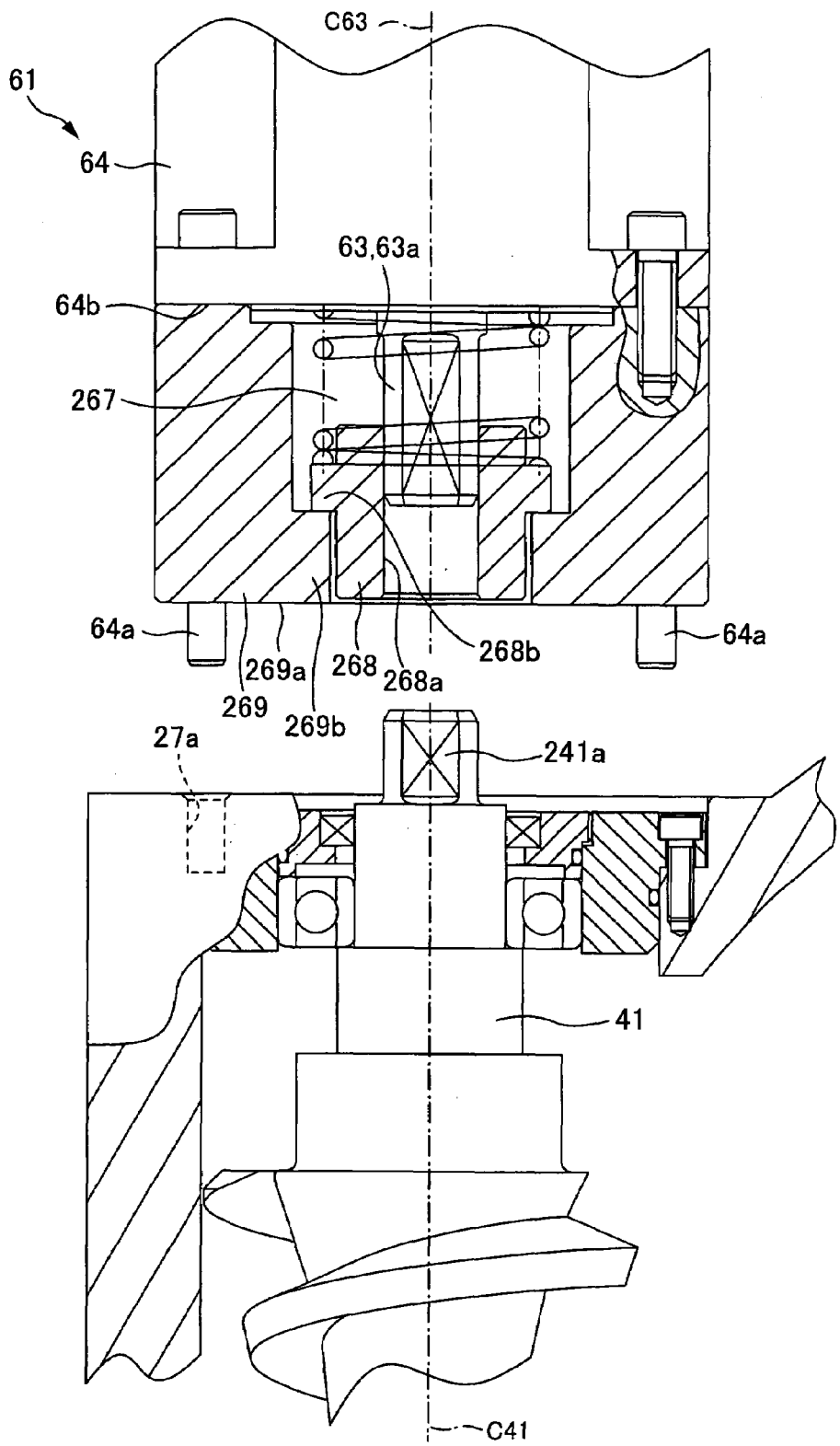
FIG. 17 is a center vertical sectional view of a connecting structure according to a fourth embodiment.
Figure 18:
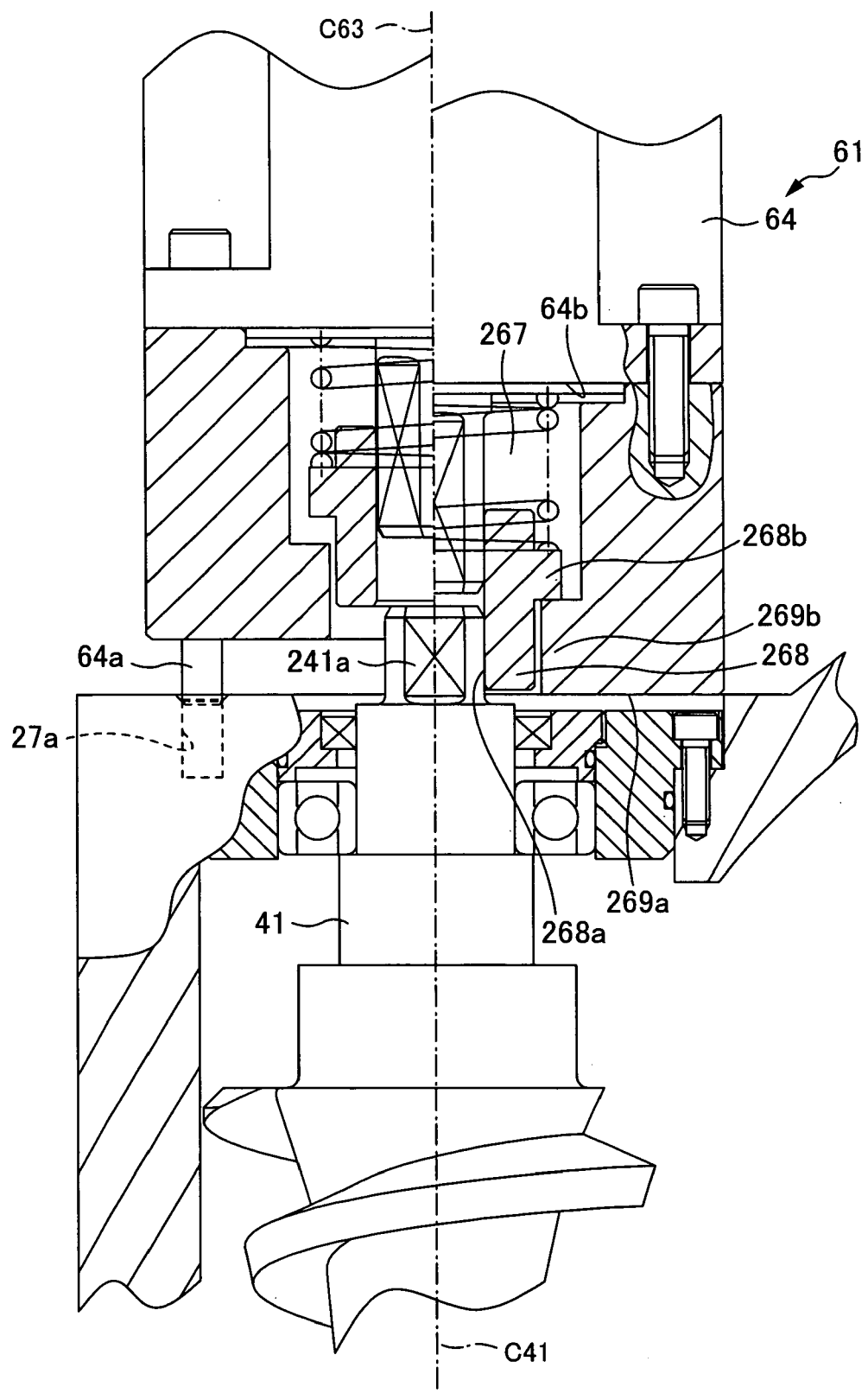
FIG. 18 is a center vertical sectional view showing the connection process.
Figure 19:
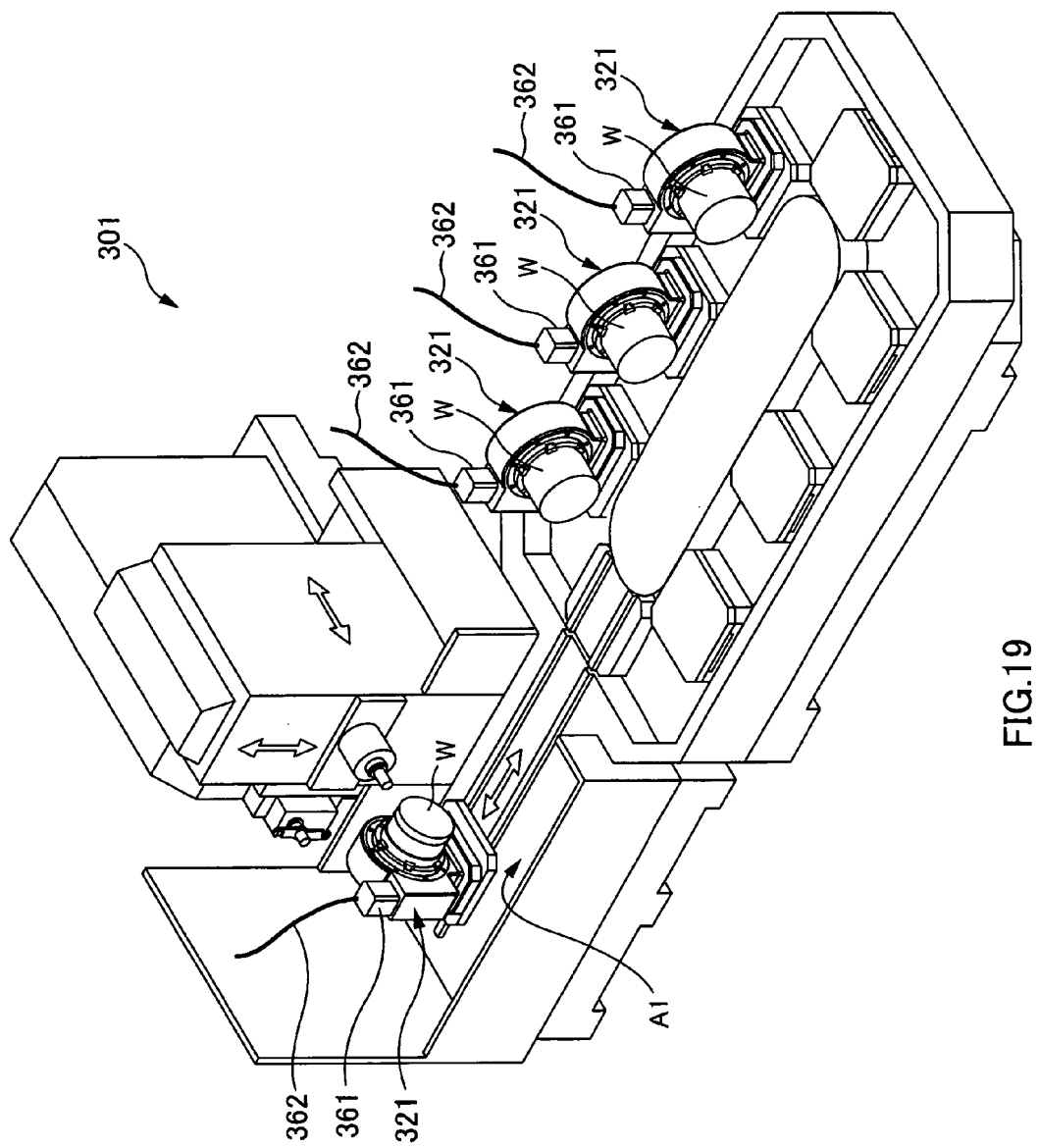
FIG. 19 is a perspective view showing a machine tool of a reference example.

FIG. 17 and FIG. 18 are explanatory diagrams of the connecting structure according to the fourth embodiment. FIG. 17 is a center vertical sectional view of the connecting structure. FIG. 18 is a center vertical sectional view showing the connecting process; in its left half the state immediately prior to connection is shown, and in its right half the connected state is shown. It should be noted that in FIGS. 17 and 18 the drive shaft 63 is shown as a side view and the input shaft 41 etc. is partially shown as a side view. Elements that are identical to those of the connecting structures according to the first embodiment are shown assigned identical reference numerals and description thereof is omitted.

The drive shaft 63 shown in FIG. 17 is provided with a shaft coupling 268 that is capable of moving up and down in the axial C63 direction. That is, the shaft coupling 268 has a rectangular through hole 268*a* that has the same horizontal cross-sectional shape as the end section 63*a* of the drive shaft 63, and the end section 63*a* of the drive shaft 63 is inserted into this through hole 268*a*. A cylindrical member 269 that sets a lower limit to the downward movement of the shaft coupling 268 is fastened to the lower end surface 64*b* of the casing 64, covering the outer circumference of the shaft coupling 268. The lower limit position of the shaft coupling 268 is defined by a flange section 268*b*, which protrudes from the outer circumferential surface of the shaft coupling 268, engaging an annular projection 269*b*, which protrudes from the inner circumferential surface of the cylindrical member 269 near the lower end surface 269*a*.

It should be noted that a downward elastic force is exerted on the shaft coupling 268 by a coil spring 267 disposed between the shaft coupling 268 and the lower end surface 64*b* of the casing 64 above it, and as a result, the shaft coupling 268 is moved upward in correspondence with an upward external force, and when this external force is not applied, the shaft coupling 268 is positioned at the lower limit position.

On the other hand, a fitting projection 241*a* is formed on the upper end section of the input shaft 41 of the rotating table apparatus 21 with its rotation center in alignment with the axis C41 of the input shaft 41, and the horizontal cross-sectional shape of the fitting projection 241*a* has the same rectangular shape as the through hole 268*a* so that it can fit into the through hole 268*a* of the shaft coupling 268.

At the time the motor 61 is lowered and the fitting projection 241*a* is fitted into the through hole 268*a* of the shaft coupling 268, if there is significant deviation between their axial positions and their rotation angles, then the fitting projection 241*a* comes into contact with a peripheral portion of the through hole 268*a* and is not guided into the through hole 268*a*. However, because the shaft coupling 268 is moved upward by the upward abutting force that is exerted from the fitting projection 241*a*, in the course of this movement, the shaft coupling 268 is given leeway for aligning the axial position and the rotation angle of the through hole 268*a* with the fitting projection 241*a*. Consequently, the amount of allowable deviation is increased by an amount that corresponds to this leeway, and thus the tolerance of deviation is larger than in the first embodiment.

<Other Considerations Regarding the Machine Tool>

Embodiments of the present invention are described above, but the present invention is not limited to these embodiments, and it can be modified as shown below within a range that does not depart from the gist thereof.

(a) With the rotating table apparatus 21 of the above-mentioned embodiments, the axial direction C23 of the table 23 is in the horizontal direction, but the axial direction C23 is by no means limited to this, and it can also be in the vertical direction or tilted with respect to the horizontal and vertical direction.

(b) The machining center 11 in the above-mentioned embodiments is a broadside machining center in which the revolving spindle 14 is horizontal, but by no means is this a limitation, and for example it can also be a so-called vertical type machining center in which a vertical spindle 14 is rotatably provided on the spindle head 13.

(c) The power source of the rotating table apparatus 21 in the above-mentioned embodiments is the motor 61, which drives by being supplied with electrical power as motive force, but as long as the motor is associated with a wired motive-force supply-path member for supplying motive force, then there is no limitation to the motor 61. For example, it is also possible to adopt a so-called air pressure motor or an oil pressure motor that is driven by being supplied with high-pressure air or oil, as the motive force, through an associated hose or pipe, for example.

However, preferably, it is a servo motor because with a servo motor it is possible to control the rotation angle of the table 23 with high precision. Consequently, if the workpiece W has a plurality of processing surfaces in the rotation direction of the table 23, then by indexing and rotating the table 23 with high precision, each processing surface can be processed and an excellent degree of processing freedom can be attained.

<<<Regarding the Detachable/Attachable Motor>>>

===First Embodiment of the Detachable/Attachable Motor===

Figure 20:
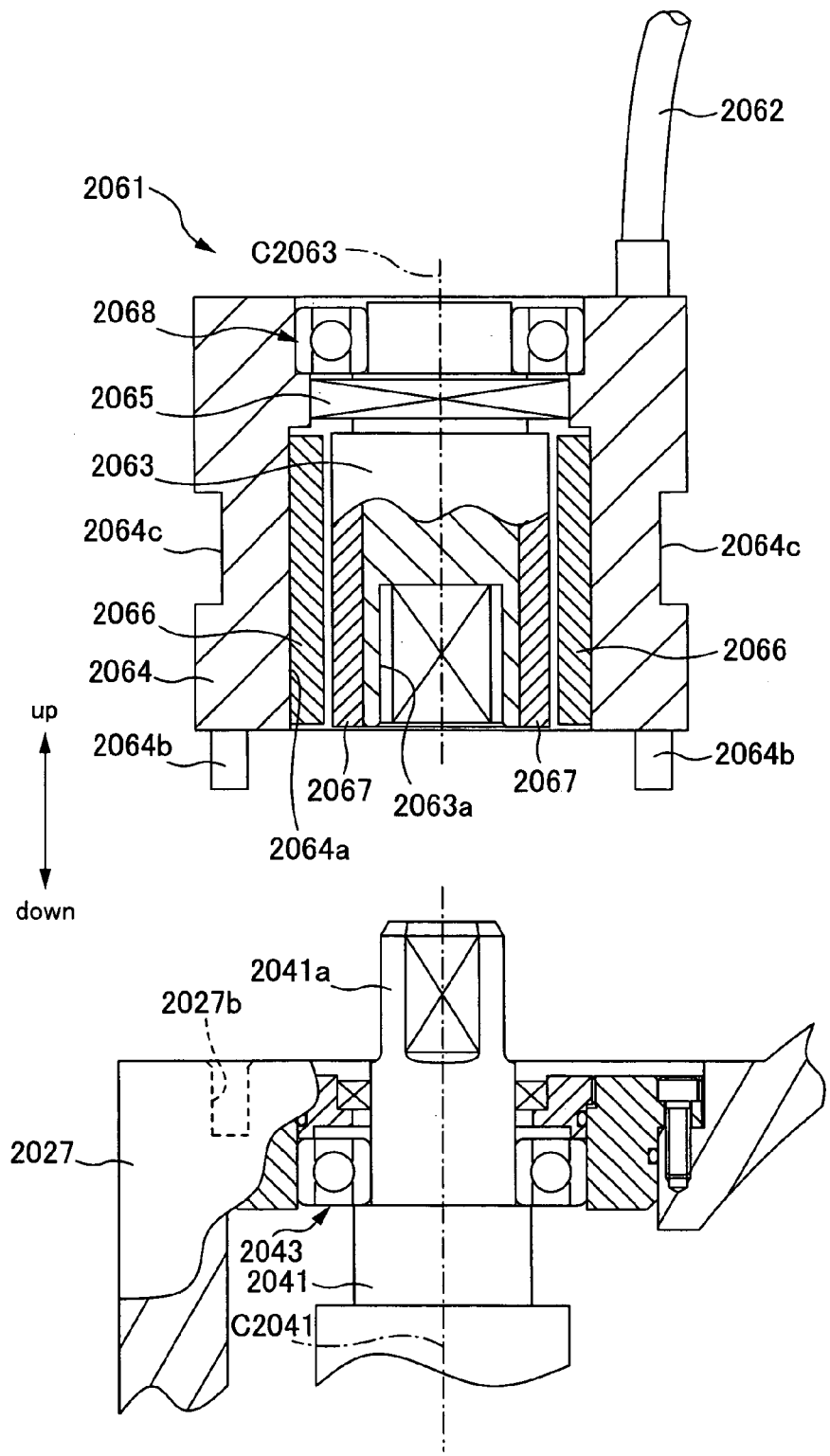
FIG. 20 is a vertical sectional view for describing a detachable/attachable motor 2061 of a first embodiment, and shows a state in which a rotor 2063 of the detachable/attachable motor 2061 has been disconnected from a driven rotation shaft 2041.
Figure 21:
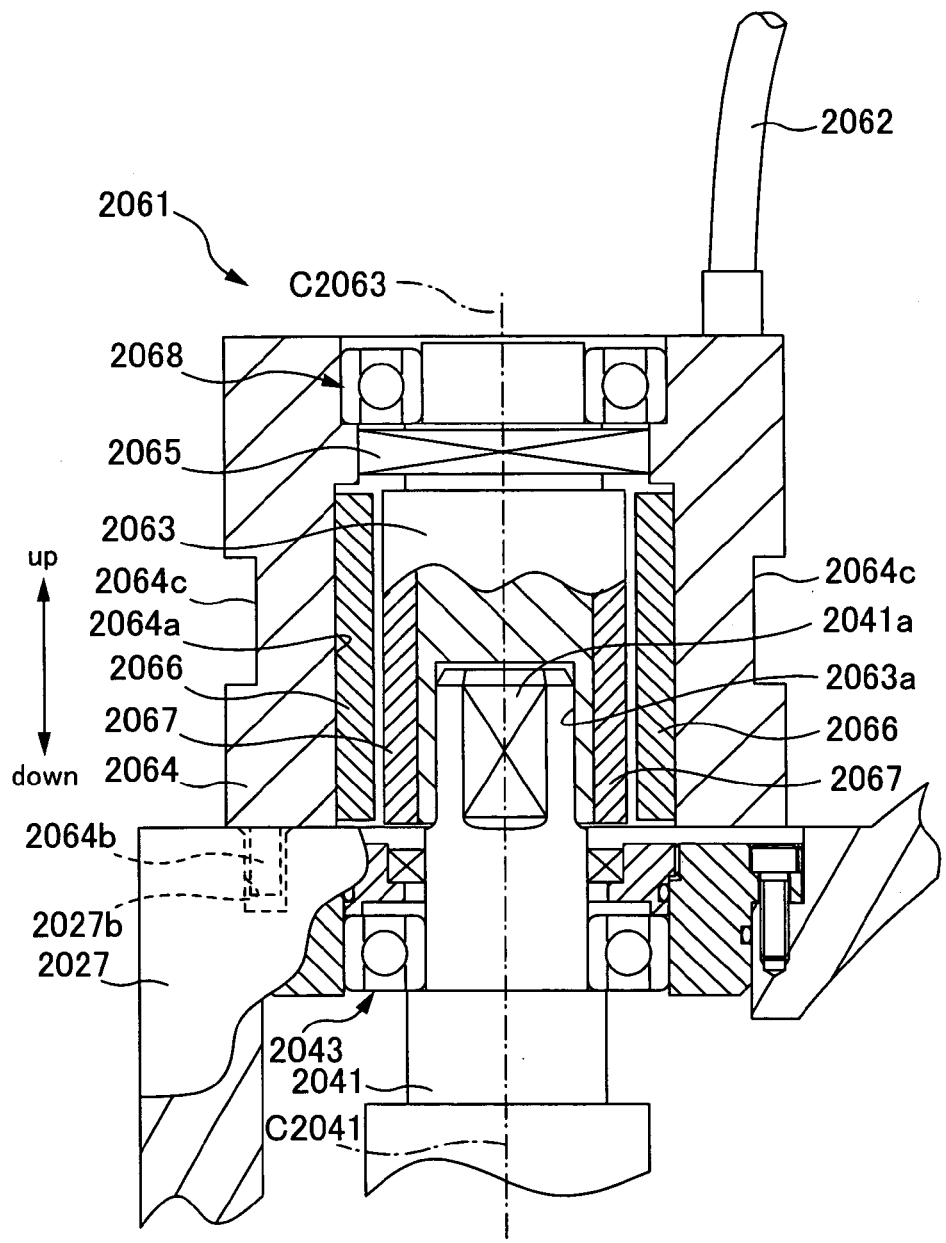
FIG. 21 is a vertical sectional view of the same, and shows a state in which the rotor 2063 has been connected to the driven rotation shaft 2041.

FIG. 20 and FIG. 21 are vertical sectional views for describing a detachable/attachable motor 2061 according to a first embodiment of the present invention. FIG. 20 shows a state in which a rotor 2063 of the detachable/attachable motor 2061 has been disconnected from a driven rotation shaft 2041, and FIG. 21 shows the connected state. It should be noted that a portion of the rotor 2063 and the driven rotation shaft 2041 are shown as a side view.

The detachable/attachable motor 2061 is for applying a rotational force to the driven rotation shaft 2041 by coaxially and detachably connecting the rotor 2063 of the detachable/attachable motor 2061 to a suitable driven rotation shaft 2041 that is supported in a manner that permits rotation about its axis C2041.

That is, a depression 2063a that engages with a projection 2041a formed on an end section of the driven rotation shaft 2041 and transmits rotational force to the driven rotation shaft 2041 is formed in an end section in the axis C2063 direction of the rotor 2063. If the driven rotation shaft 2041 is to be rotated, the depression 2063a of the rotor 2063 is engaged with the projection 2041a of the driven rotation shaft 2041 to connect the rotor 2063 to the driven rotation shaft 2041, whereas if the driven rotation shaft 2041 is not to be rotated, then the engagement between the projection 2041a and the depression 2063a is released to disconnect the rotor 2063 from the driven rotation shaft 2041.

<Driven Rotation Shaft 2041>

The driven rotation shaft 2041 shown in FIG. 20 is rotatably supported about its axis C2041 on a housing 2027, which serves as a support member, through ball bearings 2043 in such a state that its axis C2041 direction is in the up-down vertical direction. It should be noted that a pair of the ball bearings 2043 are provided in an upper portion and a lower portion of the housing 2027 so as to support both end sections of the driven rotation shaft 2041 (for example, see FIG. 28). Also, the projection 2041a, which is discussed later, is formed on the upper end section of the driven rotation shaft 2041 shown in FIG. 20.

<Detachable/Attachable Motor 2061>

The detachable/attachable motor 2061 of this first embodiment is a so-called alternating current (AC) servo motor that is provided with a casing 2064 that functions as a stator having a through hole 2064a in the vertical direction, a rotor 2063 accommodated within the through hole 2064a with its axis C2063 direction in alignment therewith and supported in such a manner that it can rotate about its axis C2063, and a rotary encoder 2065 that functions as a sensor for contactlessly detecting the rotation angle, for example, of the rotor 2063.

That is, a plurality of coils 2066 (conductive wires that have been wound for a predetermined number of times) are provided on the inner circumferential surface of the through hole 2064a of the casing 2064 in the circumferential direction at intervals of a predetermined angle, and N-pole and S-pole permanent magnets 2067 are disposed on the outer circumference portion of the rotor 2063 in a linearly symmetrical fashion with respect to the axis C2063. By sending alternating current to the coils 2066 through an associated power cable 2062 while maintaining the phase difference corresponding to the predetermined angle, the permanent magnets 2067 are magnetically attracted to and repelled by the coils 2066 in sequence, causing the rotor 2063 to rotate in a fixed direction.

(1) Casing 2064

The casing 2064 has a substantially rectangular shape. A ball bearing 2068 is provided at the upper end section of the through hole 2064a, and through this, the rotor 2063 is supported in a manner that allows it to rotate about its axis C2063. The rotary encoder 2065 is provided immediately below the ball bearing 2068, and the coils 2066 are disposed from below the rotary encoder 2065 up to substantially the lower edge of the through hole 2064a.

It should be noted that the structure of the rotary encoder 2065 is a structure that is well-known in the art. That is, it is made of a disk member (not shown) fastened to the rotor 2063 side, and a light-emitting element (not shown) and a light-receiving element (not shown) that are fastened to the casing 2064 side and vertically sandwich the disk member between them, and by the light-receiving element detecting the light that passes through numerous slits formed in the circumferential direction of the disk member, the rotation angle and the rotation velocity of the rotor 2063 are detected. Here, the rotary encoder 2065 is disposed immediately below the ball bearing 2068 so as to stably detect the rotation angle etc.

Also, a groove section 2064c is provided in the horizontal direction in a pair of opposing outer surfaces of the casing 2064. As will be discussed later, the groove section 2064c is provided for when attaching and detaching the detachable/attachable motor 2061 to and from the driven rotation shaft 2041 by a later-described motor attach-detach device 2071.

(2) Rotor 2063

The rotor 2063 has a substantially columnar shape whose upper and lower end sections are located at positions near the upper and lower edges, respectively, of the through hole 2064a where they do not protrude from the edge. Therefore, it is possible to dispose the permanent magnet 2067, which is arranged on the outer circumferential portion of the rotor 2063, in opposition to the coils 2066 up to the lower edge of the through hole 2064a in which the coils 2066 are disposed. As a result, a sufficiently wide range over which the coils 2066 and the permanent magnet 2067 are in opposition can be secured in the axis C2063 direction, and thus the detachable/attachable motor 2061 can output a large rotational force in spite of its compact outer dimension.

The lower end section of the rotor 2063 is connected to the upper end section of the driven rotation shaft 2041 in such a fashion that their rotation centers are in alignment. The two are connected through a so-called spline fitting structure, in which the depression 2063a is formed directly in the rotor 2063 with its rotation center in alignment with the axis C2063 of the rotor 2063, and the projection 2041a is formed on the driven rotation shaft 2041 with its rotation center in alignment with the axis C2041 of the driven rotation shaft 2041. In the process of lowering the detachable/attachable motor 2061 toward the driven rotation shaft 2041 positioned below it and placing it on the upper surface of the housing 2027, the depression 2063a of the rotor 2063 is fitted onto the projection 2041a of the driven rotation shaft 2041, thereby connecting the two.

It should be noted that with the structure according to this first embodiment, the depression 2063a can be quickly fitted over the projection 2041a even if at the time of this connection there is some positional shifting between the two. This is because the upper end section of the rotor 2063 is supported by the ball bearing 2068, and thus its lower end section is capable of slightly swinging about the ball bearing 2068. That is, at the time of this connection the lower end section of the rotor 2063 slides so that the depression 2063a follows the projection 2041a.

In the connected state shown in FIG. 21, this spline fitting reliably restricts relative rotation between the rotor 2063 and the driven rotation shaft 2041 about the axes, and thus the rotational force of the rotor 2063 can be reliably transmitted to the driven rotation shaft 2041. To be noted here is that the type of spline fitting that is adopted in this first embodiment is a so-called corner spline fitting in which the horizontal cross-sectional shape of the depression 2063a and the projection 2041a are both rectangular.

When the rotor 2063 of the detachable/attachable motor 2061 rotatively drives in the connected state, the casing 2064 of the detachable/attachable motor 2061 receives a rotation counterforce in the direction opposite from the rotation direction. If the casing 2064 cannot withstand this rotation counterforce and is moved, then the precision of the rotation operation of the rotor 2063 will become poor. For this reason, in this first embodiment, the casing 2064 and the housing 2067 are non-rotatably connected when in the connected state. This connecting structure, as shown in FIG. 20, is made of a plurality of rotation stop pins (engagement projections) 2064b that are provided protruding from the lower end surface of the casing 2064, and pin holes (engagement depressions) 2027b formed in the upper end surface of the housing 2027 in correspondence with the rotation stop pins 2064b. When these have engaged, the casing 2064 connected to the housing 2027 is capable of effectively opposing the rotation counterforce.

In this first embodiment, the reason why the depression 2063a rather than a protrusion is formed directly in the lower end section of the rotor 2063 is as follows. As mentioned earlier, the permanent magnet 2067 is provided on the outer circumference portion of this lower end section, but nothing is provided inside that portion. Accordingly, forming the depression 2063a directly in this inner portion allows the inner portion to be effectively utilized as a connecting member, and reduces the dimension of the detachable/attachable motor 2061 in the axis C2063 direction. It should be noted that the depression 2063a is formed directly in the lower end section, and thus it is not necessary to provide an intermediate element such as a shaft coupling for connecting to the projection 2041a of the driven rotation shaft 2041, and this has the further effect of simplifying the structure and curtailing manufacturing costs. Moreover, the impact of torsion, for example, caused by an intermediate element can be eliminated, and this allows rotational force to be transmitted to the driven rotation shaft 2041 with good precision.

Further, the ball bearing 2068 that supports the rotor 2063 normally would be provided at both the upper and lower end sections of the through hole 2064a, but in this first embodiment it is provided only in the upper end section, and is not provided in the lower end section, of the through hole 2064a.

For this reason, the rotor 2063 in the detachable/attachable motor 2061 in the disconnected state shown in FIG. 20 is supported at only one end and thus cannot rotate stably. However, when connected to the driven rotation shaft 2041 as shown in FIG. 21, the rotor 2063 is additionally supported by the ball bearings 2043 supporting the upper end section of the driven rotation shaft 2041, and thus the rotor 2063 is supported at two points and can rotate stably. Put differently, in this first embodiment, the ball bearings 2043 of the driven rotation shaft 2041 are used to support the rotor 2063 when in the connected state, and this reduces one ball bearing 2068 with which the rotor 2063 is provided. As a result, the number of ball bearings 2068 that the detachable/attachable motor 2061 is furnished with is reduced by one without impairing the stability of the rotation of the rotor 2063 in the connected state whatsoever, and thus the structure of the motor can be simplified and the manufacturing costs can be reduced.

The reason why the ball bearing 2068 is provided at the upper end section rather than the lower end section of the through hole 2064a is that in the connected state, the ball bearing 2043 of the driven rotation shaft 2041 is below the rotor 2063, and thus the rotor 2063 is completely supported at both ends by the ball bearing 2043 and the ball bearing 2068. Supporting both ends of the rotor 2063 in this way allows the rotating state of the rotor 2063 to be further stabilized.

===Second Embodiment of the Detachable/Attachable Motor===

The detachable/attachable motor 2061 of the first embodiment is a so-called synchronized type (SM type) AC servo motor in which the rotor 2063 is provided with the permanent magnet 2067. A detachable/attachable motor 2161 according to this second embodiment differs from this in that instead it is a so-called induction type (IM type) AC servo motor in which the rotor 2063 is provided with coils.

Figure 22:
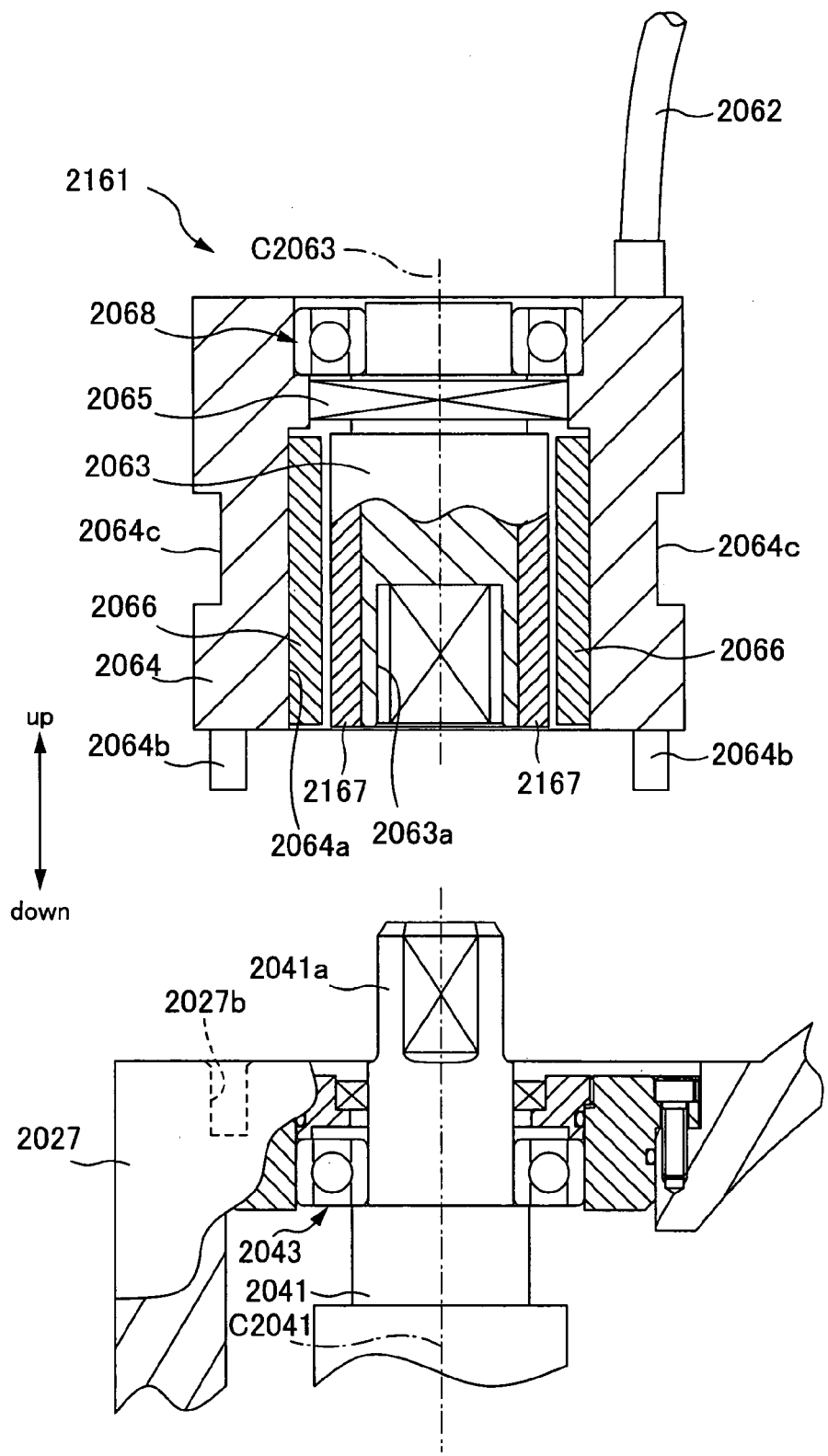
FIG. 22 is a vertical sectional view for describing a detachable/attachable motor according to a second embodiment.

FIG. 22 shows a vertical sectional view of the detachable/attachable motor 2161 according to this second embodiment. It should be noted that in this drawing, the driven rotation shaft 2041 and a portion of the rotor 2063 are shown as a side view. Components that are identical to those of the detachable/attachable motor 2061 according to the first embodiment are shown assigned identical reference numerals and description thereof is omitted.

A plurality of coils 2167 are disposed in the circumferential direction on the outer circumferential portion of the rotor 2063 in this second embodiment. It should be noted that each coil 2167 is a closed coil in which both ends of a conductive wire that has been coiled for a predetermined number of times are joined in an endless manner. Like in the first embodiment, when alternating current is sent to the coils 2066 of the casing 2064, which serves as the stator, while maintaining a predetermined phase difference, an induced current flows to the coils 2167 of the rotor 2063 due to electromagnetic induction resulting from this alternating current. The magnetic field that is generated by this induced current causes the coils 2167 of the rotor 2063 to be magnetically attracted to and repulsed by each coil 2066 of the casing 2064 in sequence, and this results in the rotor 2063 being rotated in a fixed direction.

===Third Embodiment of the Detachable/Attachable Motor===

The detachable/attachable motor 2061 according to the first embodiment is an AC motor that drives due to an alternating current, but a detachable/attachable motor 2261 of this third embodiment is a direct current (DC) motor that drives due to a direct current.

Figure 23:
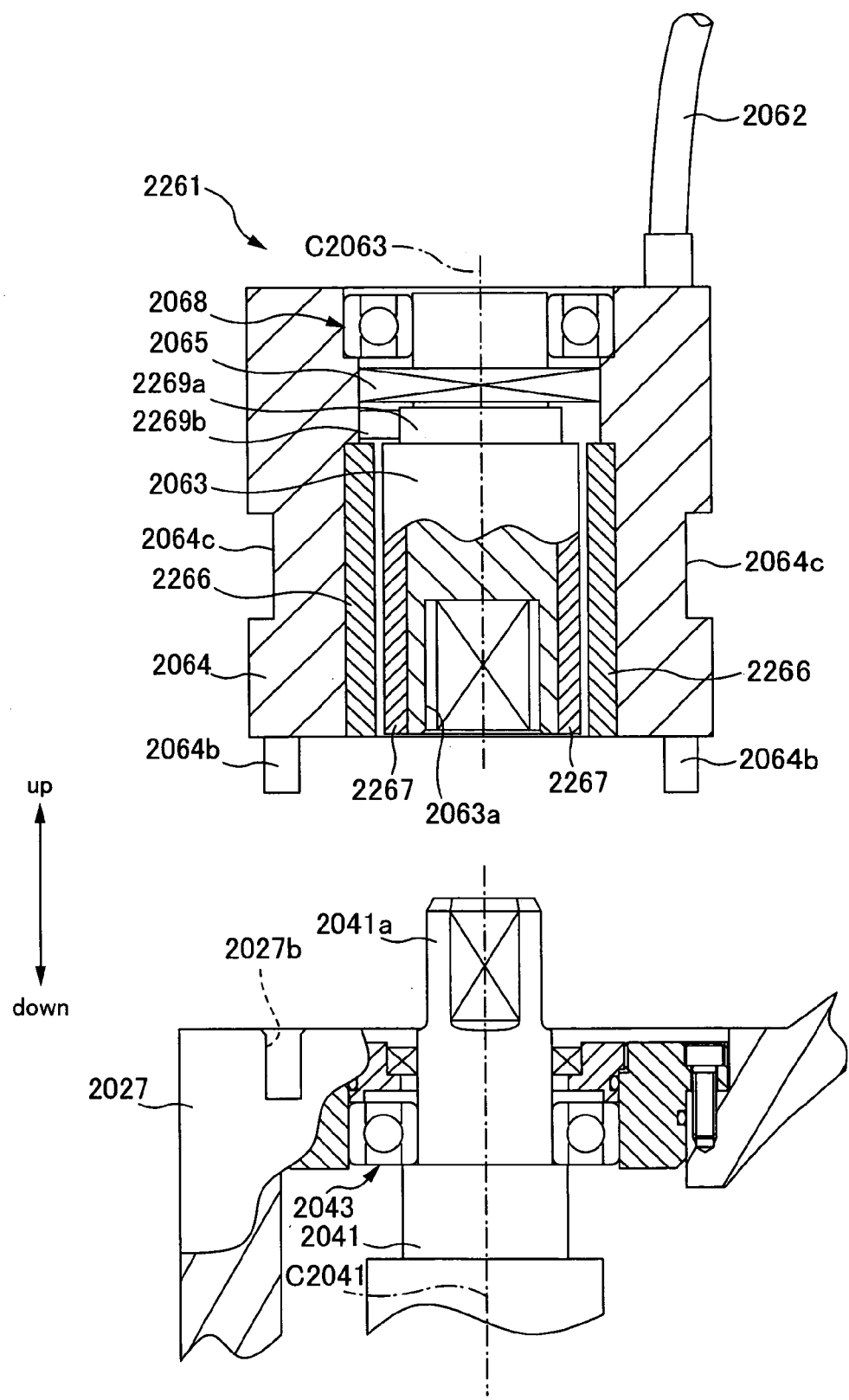
FIG. 23 is a vertical sectional view for describing a detachable/attachable motor according to a third embodiment.

FIG. 23 shows a vertical sectional view of the detachable/attachable motor 2261 according to this third embodiment. It should be noted that in this figure, the driven rotation shaft 2041 and a portion of the rotor 2063 are shown as a side view. Components that are identical to those of the detachable/attachable motor 2061 according to the first embodiment are shown assigned identical reference numerals and description thereof is omitted.

In place of the coils 2066, N-pole and S-pole permanent magnets 2266 are disposed in a linearly symmetrical fashion with respect to the axis C2063 on the inner circumferential surface 2064a of the casing 2064, which serves as the stator in the third embodiment.

On the other hand, a coil 2267 made by winding a conductive wire for a predetermined number of times is provided on the outer circumferential portion, excluding the depression 2063a of the rotor 2063, and both ends of this conductive wire are connected to a rectifier 2269a. The rectifier 2269a, together with a brush 2269b with which it is in contact, converts the direct current that has is supplied to the brush 2269b from the power cable 2062 into alternating current and sends this alternating current to the coil 2267, and the rectifier 2269*a* is arranged between the coil 2267 and a rotary encoder 2265. When alternating current flows into the coil 2267, the alternating current magnetic field that is generated by this alternating current causes the coil 2267 of the rotor 2063 to be magnetically attracted to and repelled by the N-pole and S-pole permanent magnets 2266 in sequence, and as a result the rotor 2063 is rotated in a fixed direction.

===Application Example in which the Detachable/Attachable Motor===Is Adopted in a Machine Tool 2001

<Overview of the Machine Tool 2001>

Figure 24:
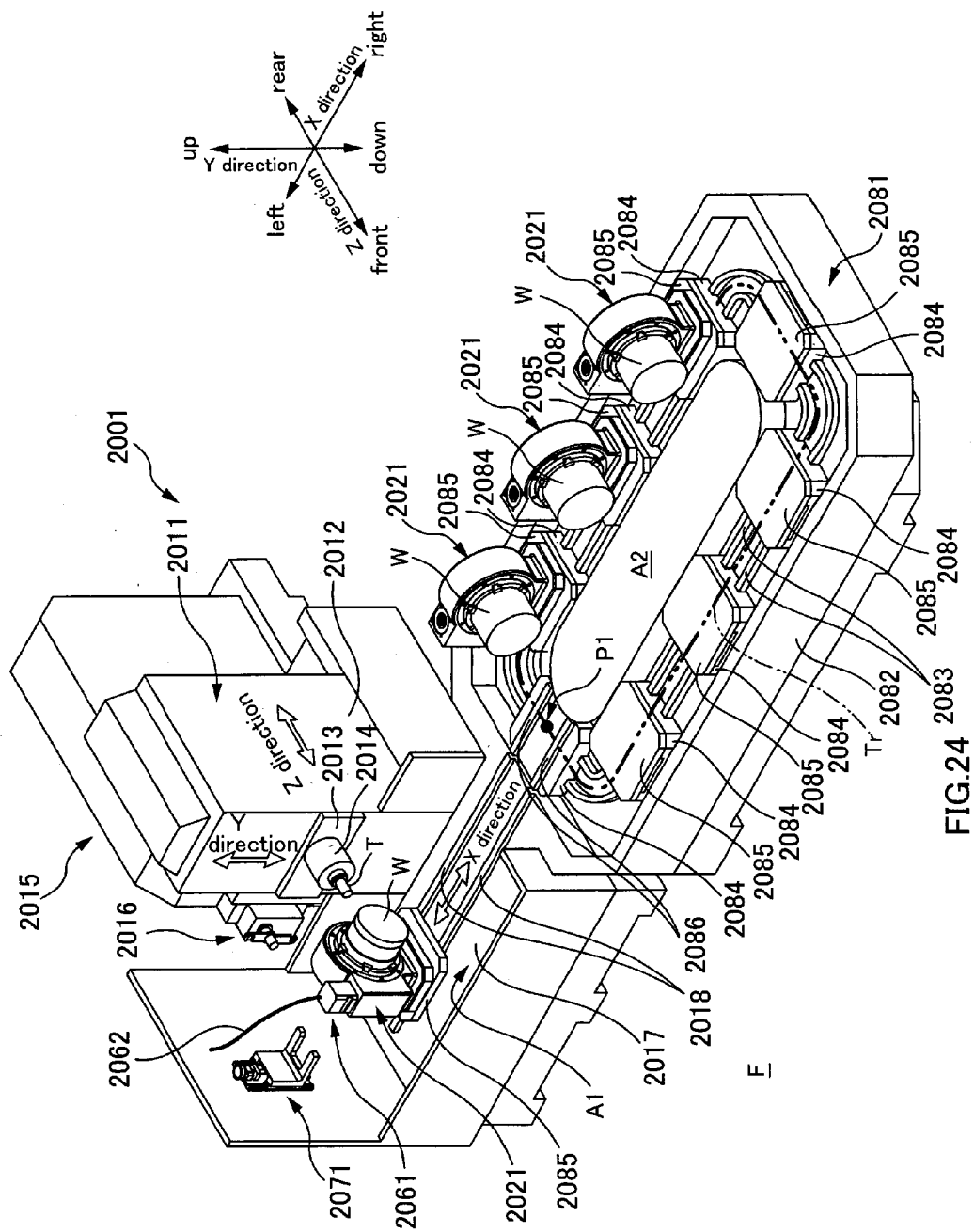
FIG. 24 is a perspective view of a machine tool 2001 that employs the detachable/attachable motor 2061 of the first embodiment.
Figure 25:
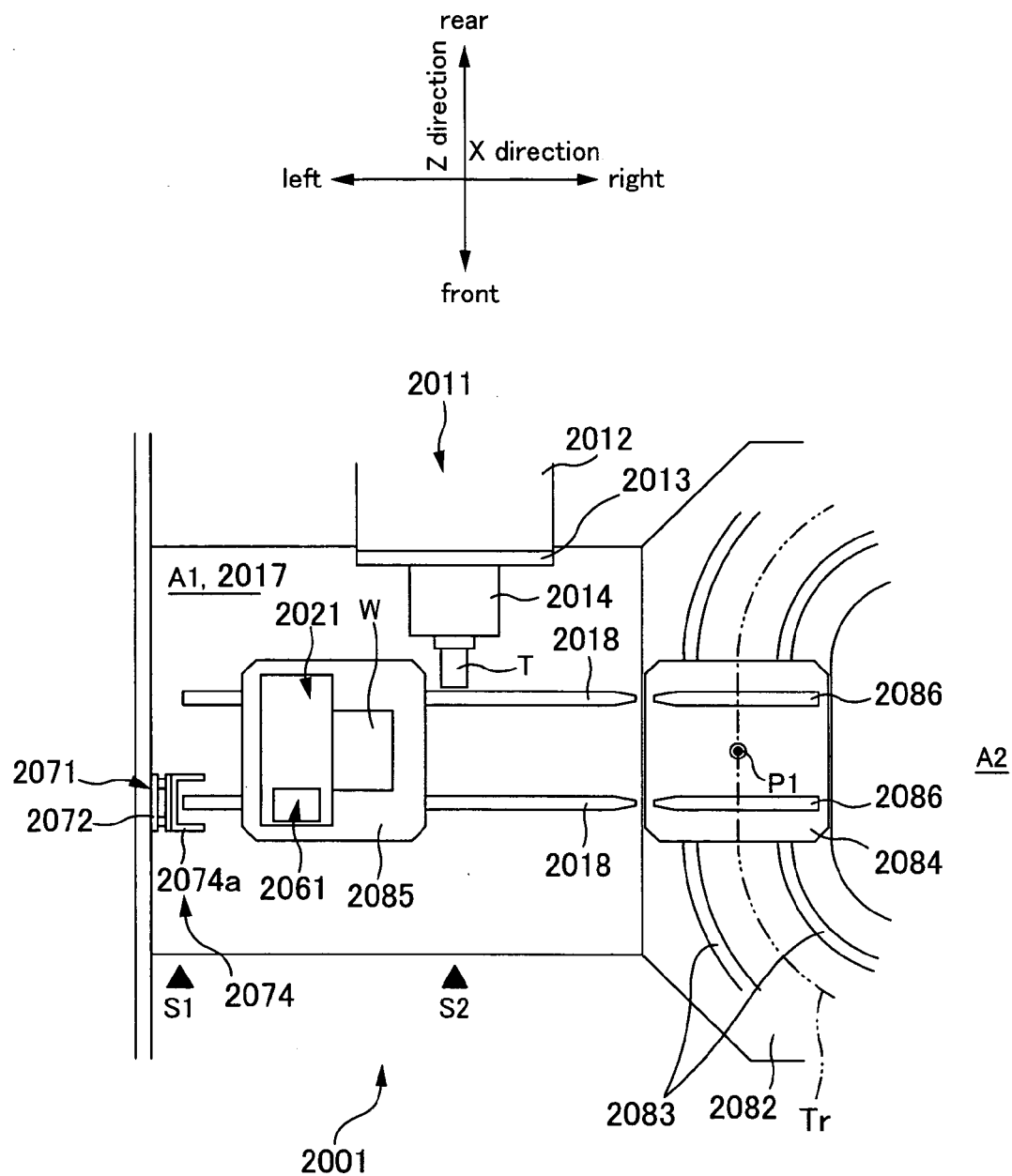
FIG. 25 is a top view showing the machine tool 2001 from the processing area A1 to the branch point P1.
Figure 26:
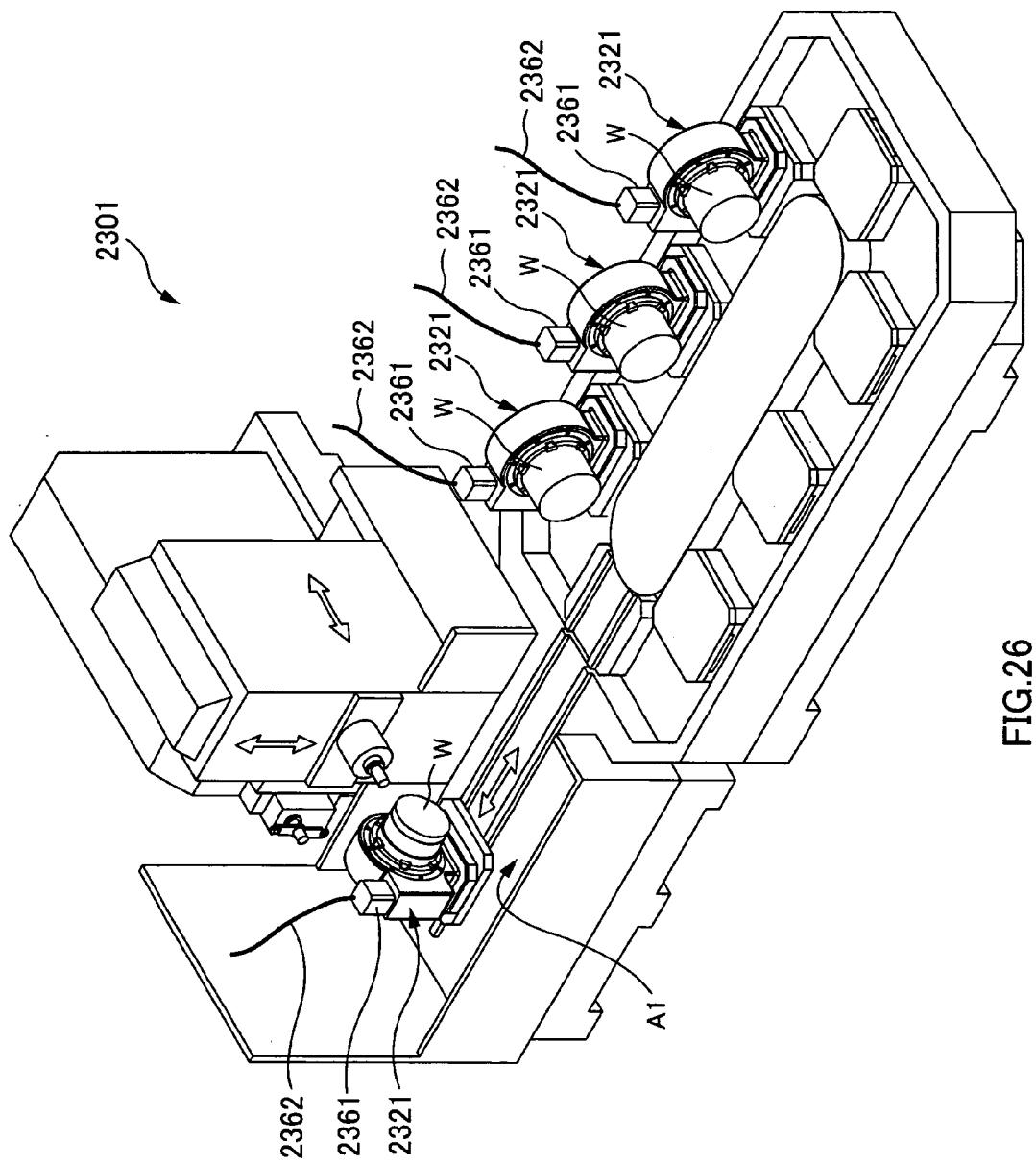
FIG. 26 is a perspective view showing a reference example of a machine tool 2301.

FIG. 24 is a perspective view of a machine tool 2001, in which the detachable/attachable motor 2061 of the first embodiment is adopted. FIG. 25 is a top view showing the machine tool 2001 from the processing area A1 to the branch point P1. FIG. 26 is a perspective view of a machine tool 2301 according to a reference example. It should be noted that for the sake of description, as shown on the upper right of FIG. 20, of the three directions perpendicular to one another, the X direction is the left-right horizontal direction, the Y direction is the up-down vertical direction, and the Z direction is the front-rear horizontal direction.

As shown in FIG. 24, the machine tool 2001 is provided with a processing area A1 for processing a workpiece W using a tool T, and a rotating table carry mechanism 2081 that carries a plurality of rotating table apparatuses 2021, each holding a workpiece W, along a predetermined carry track Tr. Here, a rotating table apparatus 2021 holding an unprocessed workpiece W is carried into the processing area A1 via a branch point P1 that has been set on the carry track Tr and that leads to the processing area A1, and once processing in the processing area A1 is over, the rotating table apparatus 2021 is carried out to the carry track Tr, still holding the processed workpiece W, via the branch point P1.

Although discussed in greater detail later, each of the rotating table apparatuses 2021 has a table 2023 that rotatably holds a workpiece W, and by rotating the table 2023, the workpiece W is suitably rotated during processing or between processing in the processing area A1. The detachable/attachable motor 2061 discussed above has been adopted as the drive source for rotating the tables 2023.

That is, the detachable/attachable motor 2061 is disposed in the processing area A1 in such a manner that it can be attached and detached to and from the rotating table apparatuses 2021, and the detachable/attachable motor 2061 is disconnected from the rotating table apparatus 2021 when carried out from the processing area A1, and connected thereto when carried into the processing area A1.

It should be noted that the reason why the detachable/attachable motor 2061 is adopted here is as follows. When a motor 2361 is provided for each rotating table apparatus 2321 like in the machine tool 2301 shown in FIG. 26 as a reference example, the power cables 2362 of the motors 2361 become tangled during carrying of the rotating table apparatuses 2321. In contrast, if the detachable/attachable motor 2061 shown in FIG. 24 is adopted, then the detachable/attachable motor 2061 can be attached to a rotating table apparatus 2021 when that rotating table apparatus 2021 has been carried into the processing area A1, and can be detached when that rotating table apparatus 2021 is carried out of the processing area A1. Thus, the rotating table apparatuses 2021 are carried in a state where the motor 2061 has been detached, and as a result, this precludes the problem of the power cable 2062 becoming tangled.

The structural elements of the machine tool 2001 are described in detail below.

<Processing Area A1>

As shown in FIG. 24, a horizontal machining center 2011 is disposed adjacent to the processing area A1 rearward in the Z direction. The horizontal machining center 2011 has a column 2012 that can move frontward and backward in the Z direction and a spindle head 2013 that is provided on the column 2012 and that can move up and down in the Y direction. A tool T is held on a horizontal spindle 2014 of the spindle head 2013. By moving the tool T in the Z direction and the Y direction with respect to a rotating table apparatus 2021 that has been carried into the processing area A1 and that can be moved left and right in the X direction, various types of processing are executed with respect to the workpiece W held by that rotating table apparatus 2021. It should be noted that X-direction movement of the rotating table apparatus 2021 within the processing area A1 is achieved through a slide guide 2018 that is disposed in the X direction on the upper surface of a base 2017 of the processing area A1.

A tool magazine 2015 storing numerous different types of tools T is disposed adjacent to the horizontal machining center 2011 to the left in the X direction, and an automatic tool changing device (ATC) 2016 is disposed between the tool magazine 2015 and the horizontal machining center 2011. The ATC 2016 exchanges the tool of the spindle 2014 that is done being used for a next tool to be used (not shown) that has been taken out from the tool magazine 2015.

Further, the above-mentioned detachable/attachable motor 2061 and a motor attach-detach device 2071 are disposed at the left end in the X direction within the processing area A1.

<Rotating Table Carry Mechanism 2081>

The rotating table carry mechanism 2081 is disposed adjacent to the processing area A1 to the right in the X direction, and has an annular circulation track Tr that is long in the X direction and that serves as the carry track Tr. The circulation track Tr is made of a rail 2083 laid out annularly on a base 2082 on the floor surface F and a plurality of moving platforms 2084 that are moved guided and supported on the rail 2083. On each moving platform 2084 is placed a pallet 2085 on which a rotating table apparatus 2021 is furnished, and by moving the moving platforms 2084 along the rail 2083, the rotating table apparatuses 2021 are carried along with their pallet 2085.

It should be noted that slide guides 2086, which become arranged in the X direction when at the branch point P1, are fastened to the upper surface of the moving platforms 2084, and a slide block (not shown) that engages the slide guides 2086 in a manner that allows sliding movement is fastened to the pallet 2085, and as a result, the pallets 2085 are guided and supported on the moving platforms 2084 in a manner that permits movement in the X direction at the branch point P1. Also, the branch point P1 is set at the left end of the circulation track Tr, and when a moving platform 2084 has stopped at this branch point P1, the slide guides 2086 of that moving platform 2084 are in alignment with the slide guides 2018 on the upper surface of the base 2017 of the processing area A1, as regards their position in the height direction (Y direction) and the Z direction. The pallet 2085 positioned at the branch point P1 can therefore be transferred to the slide guides 2018 of the processing area A1, and as a result, the rotating table apparatus 2021 on the circulation track Tr can be carried into the processing area A1. Of course, a pallet 2085 that is in the processing area A1 can be transferred to the slide guides 2086 of a moving platform 2084 that is stopped at the branch point P1, and thus the rotating table apparatus 2021 of the processing area A1 can be carried out to the circulation track Tr.

Incidentally, the rotating table apparatuses 2021 in the circulation track Tr are carried with their workpiece W facing toward the inner side of the circulation track Tr as shown in FIG. 24. Consequently, the inner side empty space enclosed by the circulation track Tr can be utilized, for example, as a work area A2 for causing the rotating table apparatuses 2021 to hold a workpiece W.

As shown in FIG. 25, at the branch point P1, the rotating table apparatuses 2021 are carried into the processing area A1 positioned to the left of the circulation track Tr with their workpiece W facing inward, that is, facing to the right, and the detachable/attachable motor 2061 and the motor attach-detach device 2071 are disposed at the left end of the processing area A1. The rotating table apparatus 2021, the motor 2061, and the motor attach-detach device 2071 are therefore positioned more toward the left end of the processing area A1 than the workpiece W, and thus these devices 2021, 2061, and 2071 do not interfere whatsoever with the processing task performed by the machining center 2011 to the right of the workpiece W.

<Rotating Table Apparatus 2021>

Figure 27:
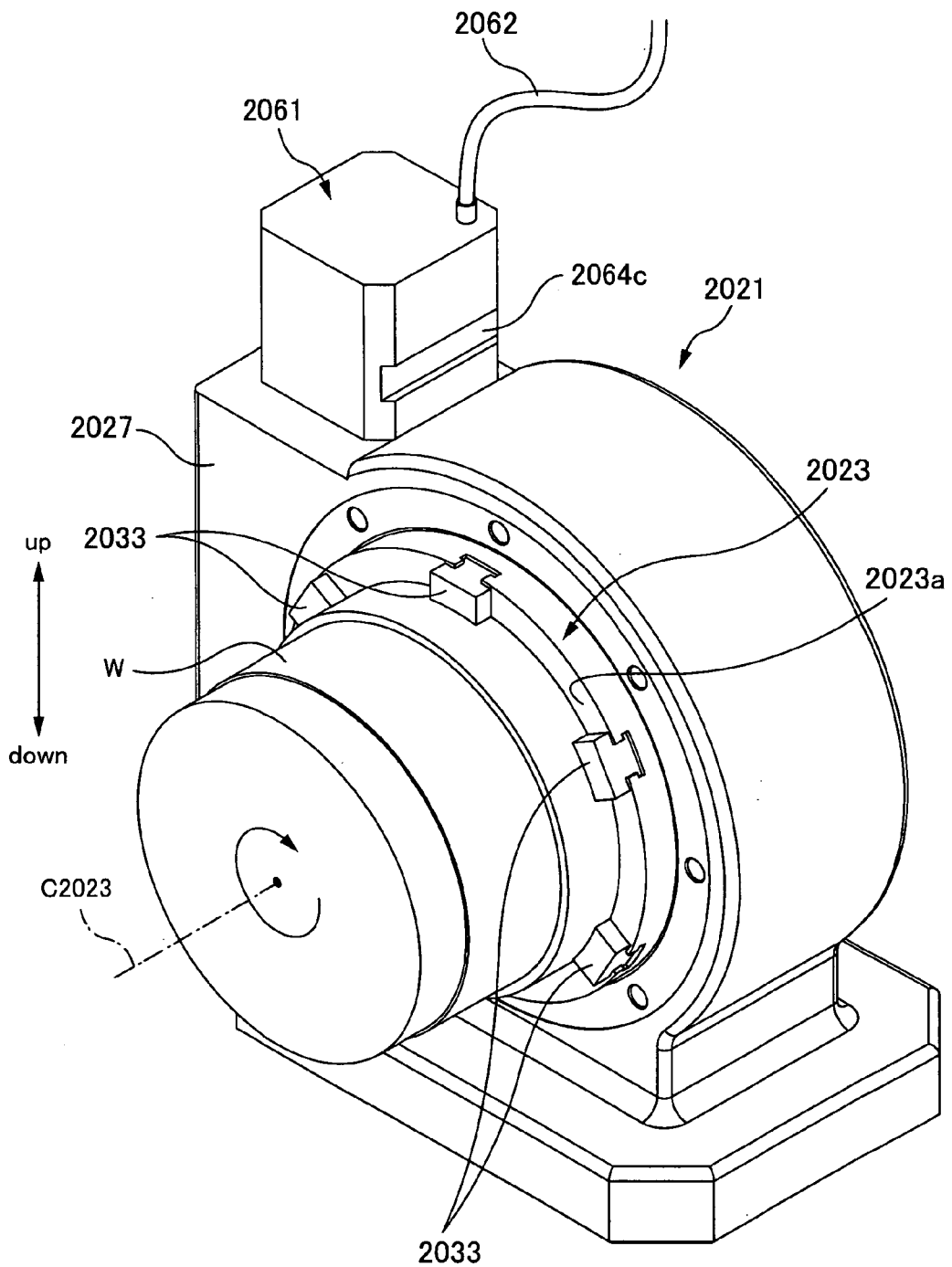
FIG. 27 is a perspective view of the rotating table apparatus 2021 when the detachable/attachable motor 2061 has been connected.
Figure 28:
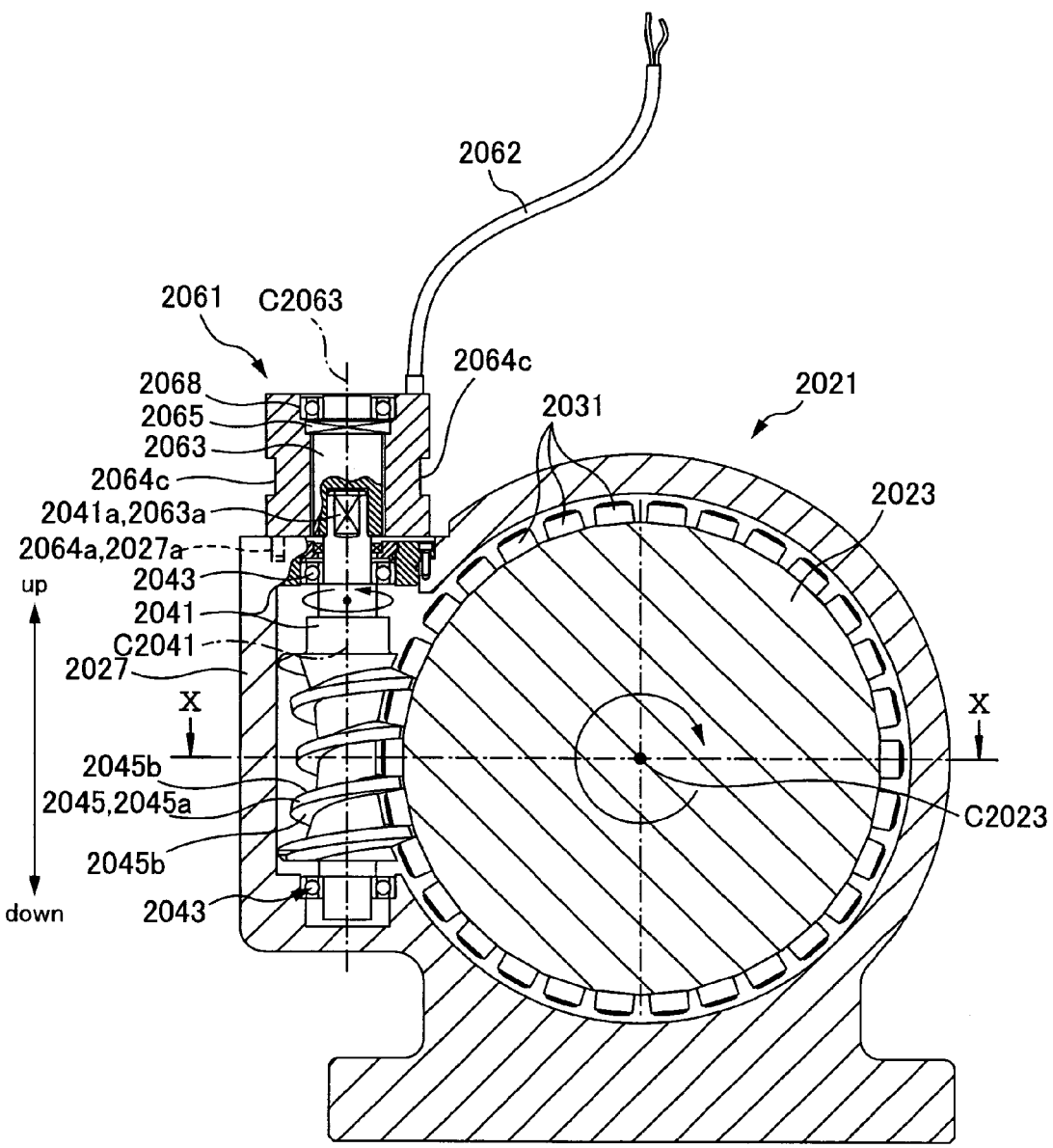
FIG. 28 is a center vertical sectional view of the same.
Figure 29:
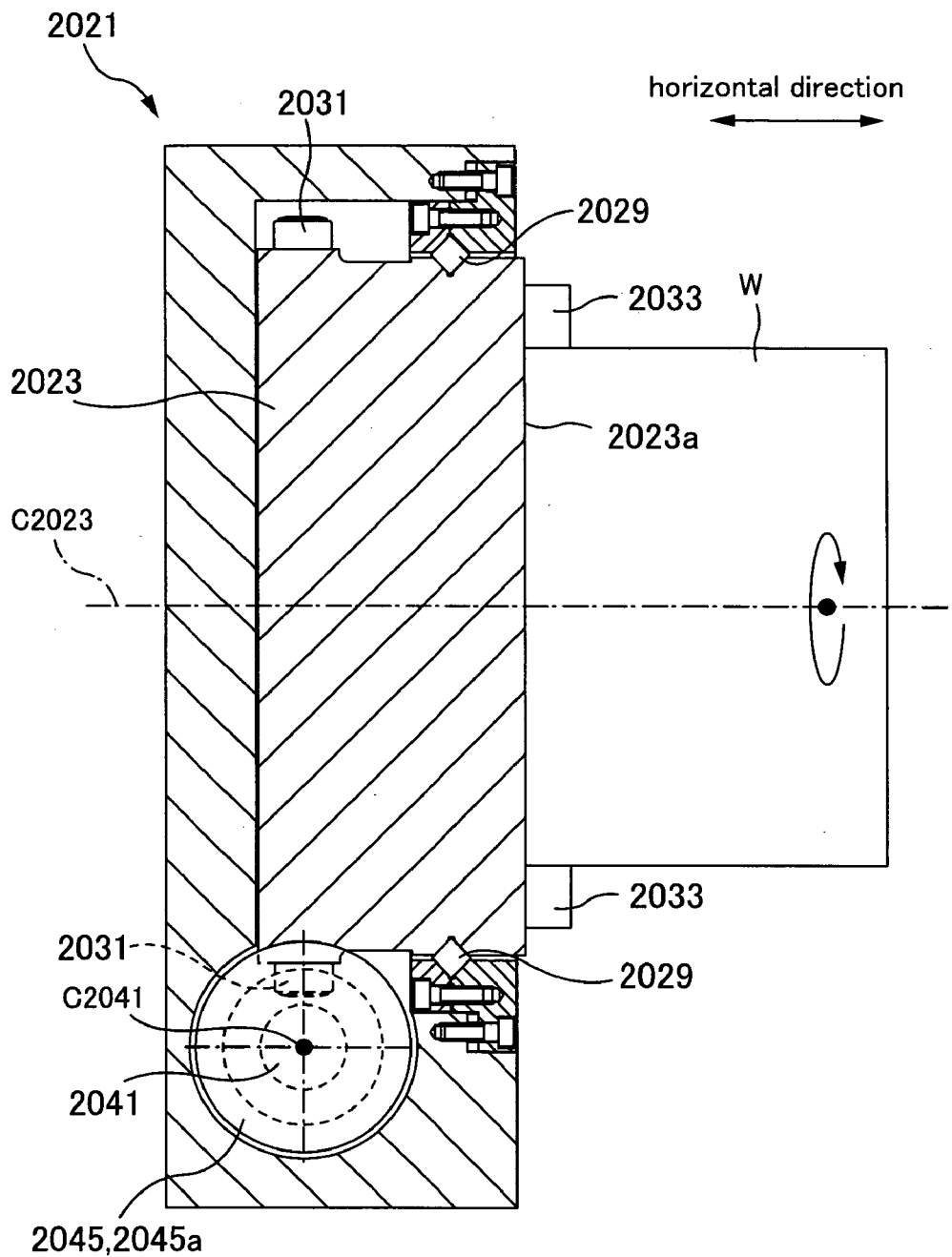
FIG. 29 is a cross section taken in the arrow direction along the line X—X in FIG. 28.
Figure 30:
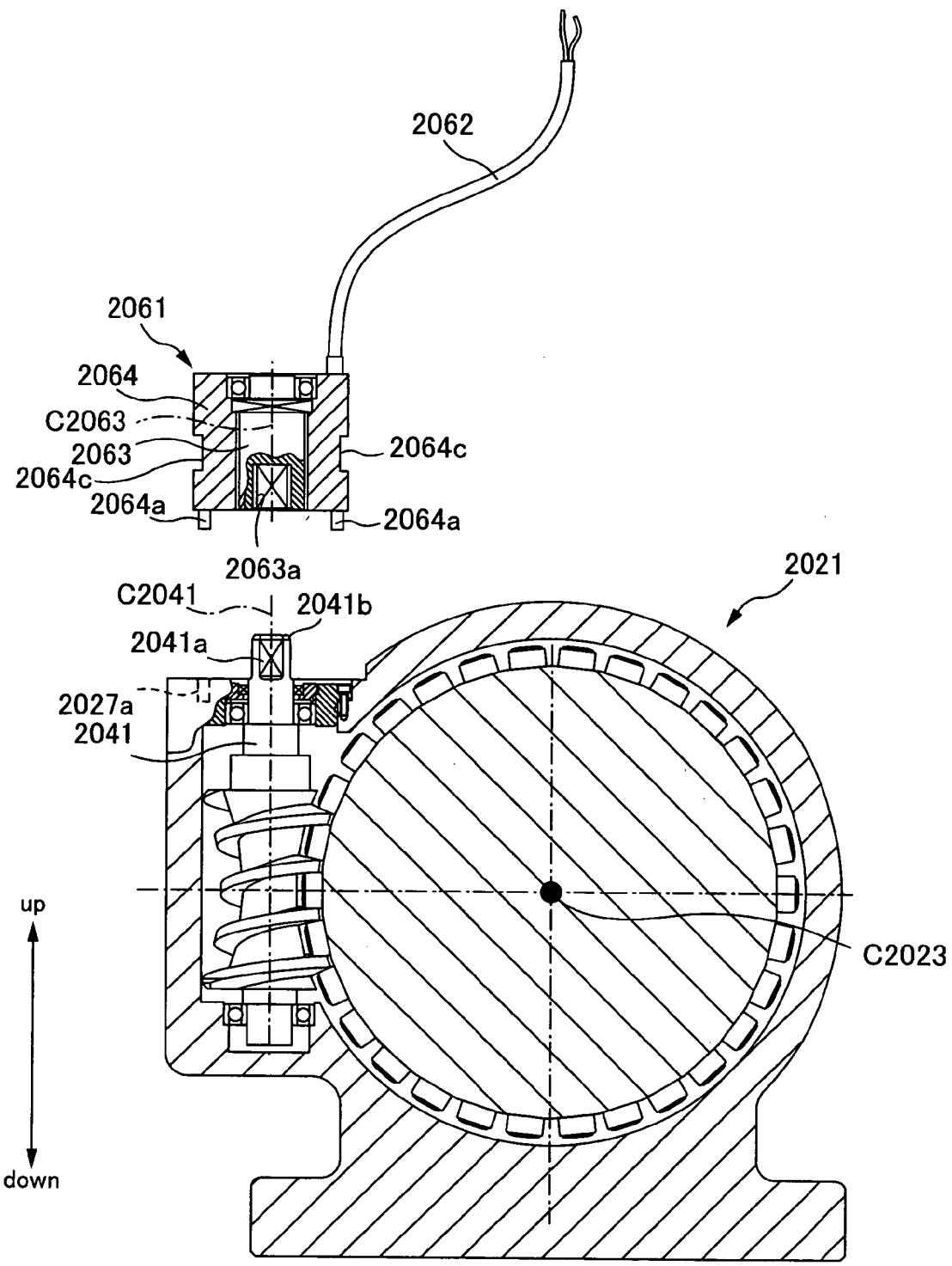
FIG. 30 is a center vertical sectional view of the rotating table apparatus 2021 when the motor 2061 has been disconnected.

FIGS. 27 to 30 are explanatory diagrams of the rotating table apparatus 2021. FIG. 27 is a perspective view of the rotating table apparatus 2021 when the detachable/attachable motor 2061 has been connected, FIG. 28 is a center vertical sectional view through the rotating table apparatus 2021, and FIG. 29 is a sectional view taken in the arrow direction along the line X—X in FIG. 28. FIG. 30 is a center vertical sectional view of the rotating table apparatus 2021 when the detachable/attachable motor 2061 has been disconnected. It should be noted that in FIG. 28 and FIG. 30, the input shaft 2041 etc. and a portion of the rotor 2063 are shown as a side view.

The rotating table apparatus 2021 is provided with a substantially columnar table 2023 that can rotate while holding a workpiece W, an input shaft 2041 to which a rotational force for rotating the table 2023 is input, and a housing 2027 that rotatably supports the table 2023 and the input shaft 2041. When the detachable/attachable motor 2061 of the processing area A1 is connected to the input shaft 2041 and a rotational force is input, the table 2023 is rotated about its axis C2023. It should be noted that that here, the input shaft 2041 corresponds to the driven rotation shaft, and the housing 2027 corresponds to the support member.

More specifically, as shown in FIG. 29, the table 2023 is supported on the housing 2027 via cross-roller bearings 2029 with its axis C2023 in the horizontal direction. A plurality of cam followers 2031 are provided on the outer circumferential surface of the table 2023 at a fixed spacing in the circumferential direction. A chuck 2033 for holding a workpiece W is provided on the surface 2023a of the table 2023.

On the other hand, as shown in FIG. 28, the input shaft 2041 is rotatably supported on the housing 2027 through a pair of upper and lower ball bearings 2043 while its axis C2041 is arranged in the vertical direction. The rotor 2063 of the detachable/attachable motor 2061 is connected to the upper end section of the input shaft 2041.

A globoidal cam 2045 that engages the cam followers 2031 is formed in the outer circumferential surface of the input shaft 2041. That is, a rib 2045a is formed in a helix in the outer circumferential surface of the input shaft 2041, and the cam followers 2031 mesh with this rib 2045a. The position where the rib 2045a is formed is shifted vertically in the axial direction along the circumferential direction of the input shaft 2041, and thus in conjunction with the rotation of the globoidal cam 2045 that results when the input shaft 2041 is rotatively driven by the motor 2061, the cam followers 2031 that mesh with the rib 2045a are sequentially moved in the circumferential direction of the table 2023, thereby rotating the table 2023 about its horizontal central axis C2023.

<Detachable/Attachable Motor 2061 and Motor Attach-Detach Device 2071>

The detachable/attachable motor 2061 is disposed in the processing area A1 shown in FIG. 24. As shown in FIG. 24 and FIG. 28, the detachable/attachable motor 2061 functions as a drive source that is connected to the rotating table apparatus 2021 that has been carried into the processing area A1, and is disconnected from the rotating table apparatus 2021 as shown in FIG. 30 when processing of the workpiece W is finished and the rotating table apparatus 2021 is to be carried out of the processing area A1. Consequently, as shown in FIG. 24, the rotating table apparatus 2021 is not provided with the motor 2061 when it is in a location other than the processing area A1, and this makes it possible to preclude the problem of the power cable 2062 associated with the motor 2061 becoming tangled when carrying the rotating table apparatus 2021.

As shown in FIG. 30, the detachable/attachable motor 2061 has the same structure as in the first embodiment discussed above, and is provided with a casing 2064 as a stator, and a rotor 2063 whose shaft is rotatably supported by the casing 2064. The rotor 2063 rotates about the axis C2063 when an alternating current is supplied from the associated power cable 2062.

The axis C2063 of the rotor 2063 is arranged in the vertical direction and thus the lower end section of the rotor 2063 is connected to the upper end section of the input shaft 2041 of the rotating table apparatus 2021 with their rotation axes in alignment.

This connecting structure is a spline fitting, which was discussed above, in which a depression 2063a is formed in the rotor 2063 of the detachable/attachable motor 2061 with its rotation center in alignment with the axis C2063, and a projection 2041a is formed on the input shaft 2041 of the rotating table apparatus 2021 with its rotation center in alignment with the axis C2041. In the process of lowering the detachable/attachable motor 2061 with respect to the rotating table apparatus 2021 positioned below it and placing it on the upper surface of the housing 2027, the depression 2063a of the rotor 2063 is fitted over the projection 2041a of the input shaft 2041, thereby connecting the two. It should be noted that the peripheral portion 2041b of the projection 2041a has been chamfered so that at the time of this fitting, slight shifting between the two with regard to the position of their axes or their rotation angles is permitted, allowing the projection 2041a to be quickly guided into the depression 2063a.

At the time of this connection, rotation stop pins 2064a in the lower end surface of the casing 2064 engage pin holes 2027a in the upper end surface of the housing 2027. Thus, the casing 2064 is non-rotatably connected to the housing 2027, and therefore the rotation counterforce that acts on the casing 2064 when the rotor 2063 of the detachable/attachable motor 2061 is rotatively driven can be effectively opposed.

Figure 31:
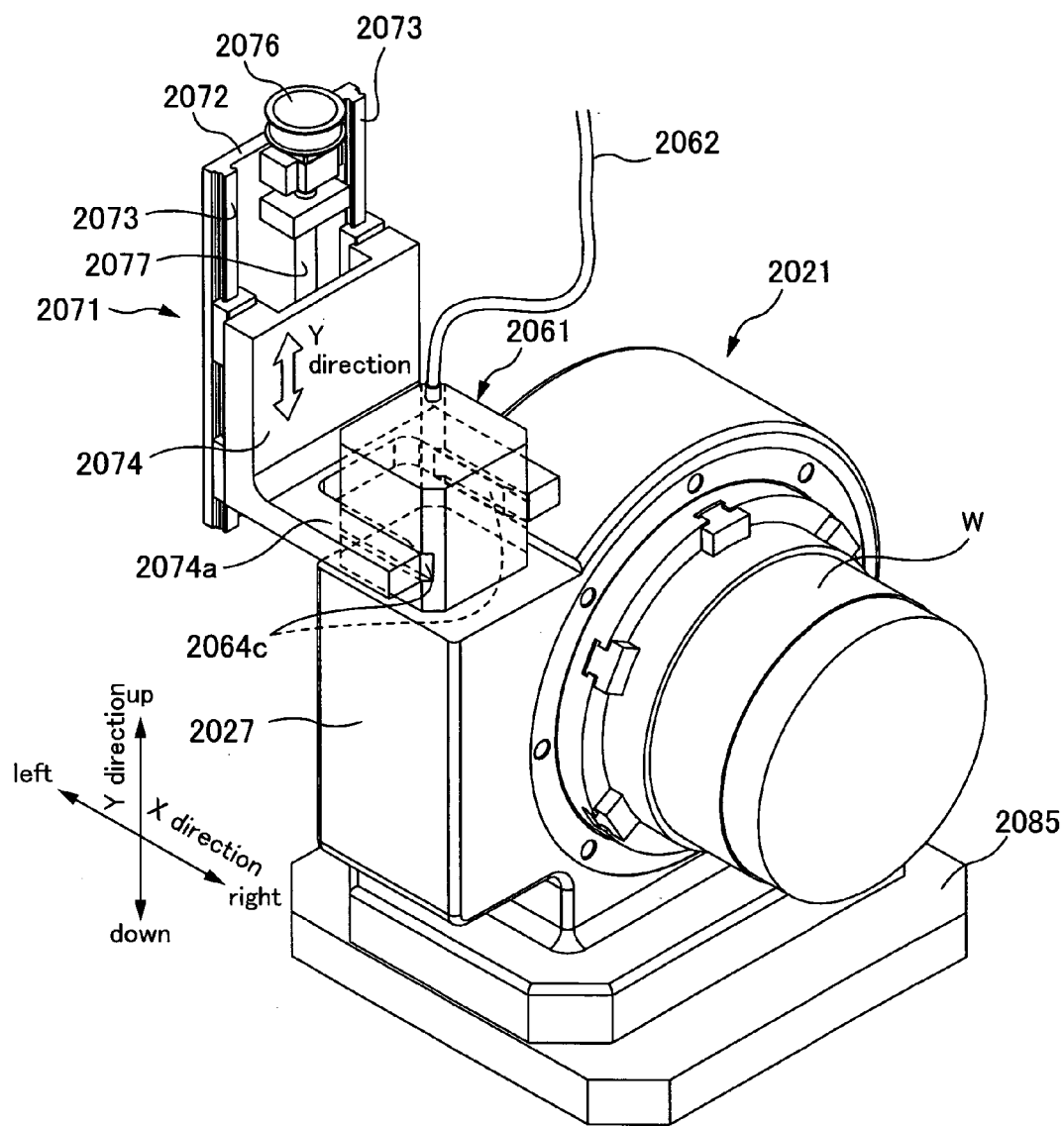
FIG. 31 is a perspective view showing how the rotating table apparatus 2021 and the motor 2061 are connected by the motor attach-detach device 2071.
Figure 32:
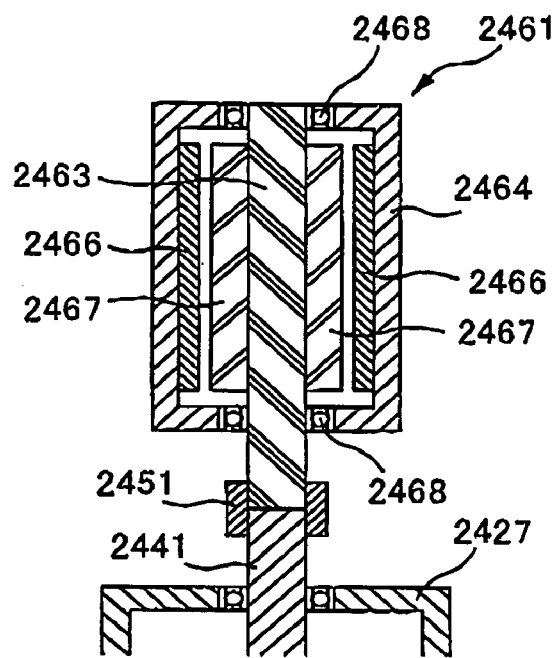
FIG. 32 is a diagram for describing the structure of a conventional motor.

Attaching and detaching the detachable/attachable motor 2061 to and from the rotating table apparatuses 2021 is performed by the motor attach-detach device 2071 disposed in the processing area A1. FIG. 31 shows a state in which a rotating table apparatus 2021 and the detachable/attachable motor 2061 are connected by the motor attach-detach device 2071.

The motor attach-detach device 2071 is provided with a main unit 2072 that is fastened to the processing area A1 and a pinching section 2074 that is guided and supported on the main unit 2072 through a linear guide 2073 in such a manner that it can be raised and lowered in the fitting direction. A U-shaped arm 2074a that opens and closes is provided at the front end in the X direction of the pinching section 2074, and by the arm 2074a opening and closing with the detachable/attachable motor 2061 positioned within it, the arm 2074a clasps and releases the detachable/attachable motor 2061.

It should be noted that here, groove sections 2064c for the arm 2074a to grasp are formed in a pair of opposing outer surfaces of the casing 2064 in a horizontal direction that intersects the up-down direction. The design is such that when the arm 2074a has pinched the detachable/attachable motor 2061, it engages the groove sections 2064c. Thus, when the arm 2074a in this pinching state is raised or lowered up or down, an external force for connecting and disconnecting the detachable/attachable motor 2061 can be reliably transmitted to the detachable/attachable motor 2061 without the detachable/attachable motor 2061 dropping from the arm 2074a, and thus the operation of connecting and disconnecting can be reliably executed.

It should be noted that a feed screw mechanism provided with a motor 2076, for example, can be adopted as the drive mechanism for raising and lowering the pinching section 2074. That is, a male screw 2077 whose axis is aligned in the up-down direction is provided on the main unit 2072 of the motor attach-detach device 2071 such that its shaft is rotatably supported thereby, and a female screw (not shown) is fastened to the pinching section 2074 and mates with the male screw 2077. Thus, when the male screw 2077 is rotated due to rotation of the motor 2076, the female screw that is mated with the male screw 2077 is moved in the up-down direction, which is the axial direction, and thus the pinching section 2074 can be raised and lowered.

With this motor attach-detach device 2071, the motor 2061 is attached and detached as follows.

First, as shown in FIG. 25, the rotating table apparatus 2021 that has been carried into the processing area A1 is moved up to a motor attach-detach position S1 set at the left end in the X direction by its self-advancing pallet 2085. Then, the motor attach-detach device 2071 disposed at the motor attach-detach position S1 lowers the pinching section 2074, which is pinching the motor 2061, from an upper standby position to place the motor 2061 on the upper surface of the housing 2027 of the rotating table apparatus 2021 as shown in FIG. 31 and stops when the motor is placed thereon. It should be noted that the fitting projection 2041a of the input shaft 2041 of the rotating table apparatus 2021 is fitted into the fitting depression 2063a of the rotor 2063 of the motor 2061 as shown in FIG. 28 in the course of this lowering, and the rotation stop pins 2064a of the casing 2064 of the motor 2061 are inserted into the pin holes 2027a of the housing 2027 of the rotating table apparatus 2021. The positional relationship at which this fitting etc. takes place is achieved by suitably adjusting the position of the motor attach-detach device 2071 in the horizontal plane.

Then, maintaining the state shown in FIG. 31, the arm 2074a of the pinching section 2074 is opened to release the motor 2061 and then the pinching section 2074 is returned to the upper standby position, and with this, the operation of connecting the motor 2061 to the rotating table apparatus 2021 is completed.

Then, as shown in FIG. 25, the rotating table apparatus 2021 to which the motor 2061 has been mounted is moved in the X direction up to a processing position S2 on the right side, where the tool T of the machining center 2011 is located, and then the task of processing the workpiece W through the machining center 2011 is started. It should be noted that at the time of this processing, as shown in FIG. 27, the rotating table apparatus 2021 receives a rotational force from the motor 2061 and suitably rotates the table 2023.

Once this processing task has finished, then, as shown in FIG. 25, the rotating table apparatus 2021 is again moved to the motor attach-detach position S1 at the left end in the X direction. The motor attach-detach device 2071 then lowers the pinching section 2074 in the standby position to the above-described stop position (this corresponds to the "connecting position" in the claims) as shown in FIG. 31 and closes the arm 2074a of the pinching section 2074 to clasp the motor 2061. The pinching section 2074 is then raised in that state to the standby position. It should be noted that, as shown in FIG. 30, during the course of this upward lifting, the fitting projection 2041a is withdrawn from the fitting depression 2063a and the rotation stop pins 2064a are withdrawn from the pin holes 2027a, thereby disconnecting the motor 2061 from the rotating table apparatus 2021, and with this, the operation of disconnecting the motor 2061 from the rotating table apparatus 2021 is completed. The rotating table apparatus 2021 from which the motor 2061 has been disconnected is then moved to the right in the X direction and transferred to the moving platform 2084 waiting for it at the branch point P1 shown in FIG. 25, thus carrying that rotating table apparatus 2021 out of the processing area A1 to the circulation track Tr.

===Other Considerations Regarding the Detachable/Attachable Motor===

Embodiments of the present invention are described above, but the present invention is not limited to these embodiments, and it can be modified as shown below within a range that does not depart from the gist thereof.

(a) The axis C2041 of the driven rotation shaft 2041 according to the foregoing embodiments lies in the vertical direction, but by no means is the direction of the axis C2041 limited to this, and it can also be in the horizontal direction or tilted with respect to the horizontal and vertical directions.

(b) The detachable/attachable motors 2061, 2161, and 2261 of the foregoing embodiments are provided with rotation stop pins 2064b in the lower end surface of their casing 2064, but pin holes can be provided instead. It should be obvious that in this case, the rotation stop pins are provided projecting from the upper end surface of the housing 2027 of the driven rotation shaft 2041. With this configuration, it is possible to achieve detachable/attachable motors 2061, 2161, and 2261 that are even more compact in the axis C2063 direction.

(c) The driven rotation shaft 2041 and the rotor 2063 of the detachable/attachable motor 2061 according to the foregoing embodiments are supported by ball bearings, but there is no limitation regarding the bearing type, and for example it is also possible to use a roller bearing.

(d) In the rotating table apparatus 2021 in the foregoing application example, the axis C2023 direction of the table 2023 lies in the horizontal direction, but by no means is the axis C2023 direction limited to this, and it can also be in the vertical direction or in a direction that is tilted with respect to the horizontal and vertical directions.

(e) The machining center 2011 in the foregoing application example is a horizontal machining center in which the rotating spindle 2014 is arranged horizontally, but by no means is this a limitation, and for example it is also possible to adopt a so-called vertical machining center in which a vertical spindle 2014 is rotatably provided on the spindle head 2013.

(f) The motor attach-detach device 2071 in the foregoing application example has a structure in which a U-shaped arm 2074a is opened and closed, but a structure in which it is not opened and closed also is possible. In this case, the attaching and detaching of the motor 2061 to the rotating table apparatuses 2021 is performed as follows.

First, as shown in FIG. 25, the rotating table apparatus 2021 that has been carried into the processing area A1 moves up to the motor attach-detach position S1 set at the left end in the X direction due to the self-movement of its pallet 2085. The motor attach-detach device 2071 at the motor attach-detach position S1 makes the inner side portion of the U-shaped arm 2074a engage with the groove sections 2064c of the motor 2061, thereby supporting the motor 2061. The arm 2074a is then lowered from the upper standby position and stops at a placing position at which the motor 2061 has been placed on the upper surface of the housing 2027 of the rotating table apparatus 2021 as shown in FIG. 31. It should be noted that in this placing position, the motor 2061 is connected to the rotating table apparatus 2021.

Then, with the arm 2074a stopped at the placing position as shown in FIG. 31, the rotating table apparatus 2021 is moved in the X direction up to the processing position S2 on the right side, and at this time, the groove sections 2064c and the arm 2074a are disengaged and the motor 2061 is transferred from the motor attach-detach device 2071 to the rotating table apparatus 2021.

Next, the task of processing the workpiece W with the machining center 2011 is executed at the processing position S2, and when this processing task is finished, the rotating table apparatus 2021 is again moved to the motor attach-detach position S1 at the left end in the X direction as shown in FIG. 25. However, prior to this, the motor attach-detach device 2071 places its arm 2074a on standby at the placing position, and as a result the groove sections 2064c of the motor 2061 engage the inner portion of the U-shaped arm 2074a simply by the rotating table apparatus 2021 moving toward the motor attach-detach position S1, and thus the arm 2074a is brought into a state where it can support the motor 2061.

If the arm 2074a in that state is raised to the standby position, the motor 2061 is disconnected from the rotating table apparatus 2021 and is transferred to the motor attach-detach device 2071.

What is claimed is:

1. A machine tool comprising:
   a rotating table apparatus that has a table for holding a workpiece, and that rotates said table based on a drive force that has been input;
   a processing area for processing said workpiece, said rotating table apparatus being carried into and out from said processing area; and
   a drive source in the form of a motor for inputting said drive force when connected to said rotating table apparatus, said drive source being provided in said processing area such that said drive source can be connected to and disconnected from said rotating table apparatus by an automatic drive source attach-detach device of the machine tool for moving the motor between connected and disconnected positions.

2. A machine tool according to claim 1,
   wherein said drive source is disconnected from said rotating table apparatus when said rotating table apparatus is carried out from said processing area; and
   wherein said drive source is connected to said rotating table apparatus when said rotating table apparatus is carried into said processing area.

3. A machine tool according to claim 1,
   wherein carrying of said rotating table apparatus into and out from said processing area is performed in a state where said workpiece is held on said table.

4. A machine tool according to claim 1,
   wherein said drive source has a drive shaft that is driven to rotate by being supported on a casing of said drive source such that said drive shaft is rotatable about an axis thereof;
   wherein said rotating table apparatus has a housing that supports said table such that said table is rotatable about an axis thereof, an input shaft that is supported on said housing such that said input shaft is rotatable about an axis thereof, a cam that is formed in said input shaft, and a cam follower that is provided on an outer circumferential surface of said table and that engages said cam;
   wherein, through a first connecting structure, said drive shaft and said input shaft are detachably connected while being restricted from relative rotation about their axes; and
   wherein, through a second connecting structure, said casing when in the connected state is non-rotatably connected to said housing.

5. A machine tool according to claim 4,
   wherein said cam is a globoidal cam.

6. A machine tool according to claim 4,
   wherein said first connecting structure has, in either one of said drive shaft and said input shaft, a fitting depression that is formed with its rotation center in alignment with the axis of that shaft, and in the other shaft, a fitting projection that is formed with its rotation center in alignment with the axis of said other shaft and that fits into said fitting depression; and
   wherein said second connecting structure has an engagement depression that is formed in said housing, and an engagement projection that is formed in said casing and that engages with said engagement depression.

7. A machine tool according to claim 6,
   wherein either one of said fitting depression and said fitting projection is formed in a shaft coupling that is held, while being restricted from relative rotation, on either one of said drive shaft and said input shaft; and
   wherein said shaft coupling is movably guided in a fitting direction in accordance with an external force that acts in said fitting direction.

8. A machine tool according to claim 6,
   wherein a detach-stop structure is provided that, when detaching said fitting projection from said fitting depression, prevents said fitting projection from detaching unless a force of a predetermined intensity is applied in the direction opposite from the fitting direction.

9. A machine tool according to claim 8,
   wherein said detach-stop structure has
   an engagement groove,
   an engagement member that when in the connected state, faces said engagement groove, and a pushing member that pushes said engagement member toward said engagement groove.

10. A machine tool according to claim 6, wherein the drive-source attach-detach device has a grasping section that is movably guided in a fitting direction and the direction opposite therefrom and is disposed in said processing area; and wherein said drive source and said rotating table apparatus are connected and disconnected by moving said grasping section that has grasped said drive source in said fitting direction and the direction opposite therefrom.

11. A machine tool according to claim 1, wherein a tool held by said machine tool is disposed in said processing area; and wherein said rotating table apparatus that has been carried into said processing area is guided to be movable relative to said tool.

12. A machine tool according to claim 1, wherein a plurality of rotating table apparatuses are on standby outside said processing area, each of said rotating table apparatuses holding one of said workpiece.

13. A machine tool according to claim 1, wherein said machine tool has a carry track over which said rotating table apparatus is movably guided; and wherein a branch point that leads to said processing area is set on said carry track, and through said branch point, carrying to and from said processing area is achieved.

14. A machine tool according to claim 13, wherein said carry track has a circulation track; and wherein said circulation track is a work area in which a task of causing said rotating table apparatus to hold said workpiece is performed.

15. A machine tool according to claim 14, wherein said rotating table apparatus in said circulation track is moved with said workpiece facing to the inside of said circulation track;

wherein, at said branch point, said rotating table apparatus is carried into said processing area with said workpiece facing said inside of said circulation track, said processing area being positioned outside said circulation track; and wherein said drive source and said drive-source attach-detach device are disposed at a position in said processing area on a side that is opposite from said workpiece.

16. A machine tool according to claim 1, wherein said drive source is a servo motor.

17. A machine tool according to claim 1, wherein said drive source generates said drive force by being supplied with a motive force in the form of electrical power; and wherein a motive-force supply-path member in the form of a power cable for supplying said motive force is connected to said drive source.

* * * * *